United States Patent
Ryu et al.

(10) Patent No.: US 10,921,903 B2
(45) Date of Patent: Feb. 16, 2021

(54) PREDICTING TEXT INPUT BASED ON USER DEMOGRAPHIC INFORMATION AND CONTEXT INFORMATION

(71) Applicant: SAMSUNG ELECTRONICS CO., LTD., Suwon-si (KR)

(72) Inventors: Won-ho Ryu, Suwon-si (KR); Hee-jun Song, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/545,198

(22) Filed: Aug. 20, 2019

(65) Prior Publication Data

US 2019/0377425 A1 Dec. 12, 2019

Related U.S. Application Data

(63) Continuation of application No. 15/444,607, filed on Feb. 28, 2017, now Pat. No. 10,423,240.

(30) Foreign Application Priority Data

Feb. 29, 2016 (KR) .......................... 10-2016-0024711

(51) Int. Cl.
*G06F 3/023* (2006.01)
*G06F 3/01* (2006.01)
(Continued)

(52) U.S. Cl.
CPC ............ *G06F 3/0237* (2013.01); *G06F 3/018* (2013.01); *G06F 3/04886* (2013.01);
(Continued)

(58) Field of Classification Search
CPC ...... G06F 3/0237; G06F 40/40; G06F 40/274; G06F 3/04886
See application file for complete search history.

(56) References Cited

U.S. PATENT DOCUMENTS

2008/0244446 A1  10/2008  LeFevre et al.
2009/0249198 A1  10/2009  Davis et al.
(Continued)

FOREIGN PATENT DOCUMENTS

| KR | 10-2010-0135862 A | 12/2010 |
|---|---|---|
| KR | 10-2014-0011073 A | 1/2014 |
| WO | 20150087084 A1 | 6/2015 |

OTHER PUBLICATIONS

Communication dated Sep. 26, 2018, issued by the European Patent Office in counterpart European Application No. 17760264.6.
(Continued)

*Primary Examiner* — David E Choi
(74) *Attorney, Agent, or Firm* — Sughrue Mion, PLLC

(57) ABSTRACT

An approach, performed by a device, for recommending at least one word to be input through a keyboard is provided. The approach displays the keyboard to be used to input at least one character or text on the device. The approach selects at least one language model. The approach recommends the at least one word related to at least one character or text inputted on the keyboard, based on the at least one inputted character or text and the at least one selected language model, in which the at least one selected language model comprises at least one of a language model based on demographic properties of a user of the device, a language model based on text input histories of the user of the device, and a language model based on a context in which the keyboard is executed.

20 Claims, 23 Drawing Sheets

(51) Int. Cl.
  *G06F 40/40* (2020.01)
  *G06F 40/274* (2020.01)
  *G06F 3/0488* (2013.01)
  *G06F 40/129* (2020.01)
(52) U.S. Cl.
  CPC .......... *G06F 40/274* (2020.01); *G06F 40/40* (2020.01); *G06F 40/129* (2020.01)

(56) References Cited

U.S. PATENT DOCUMENTS

| | | |
|---|---|---|
| 2010/0131900 A1 | 5/2010 | Spetalnick |
| 2010/0298010 A1 | 11/2010 | Roth et al. |
| 2012/0223889 A1 | 9/2012 | Medlock et al. |
| 2013/0041857 A1 | 2/2013 | Medlock et al. |
| 2013/0159919 A1 | 6/2013 | Leydon |
| 2013/0211824 A1 | 8/2013 | Tseng et al. |
| 2013/0253912 A1 | 9/2013 | Medlock et al. |
| 2013/0314352 A1 | 11/2013 | Zhai et al. |
| 2014/0025371 A1 | 1/2014 | Min |
| 2014/0267045 A1* | 9/2014 | Grieves ................ G06F 3/0237 345/168 |
| 2014/0278349 A1 | 9/2014 | Grieves et al. |
| 2014/0278379 A1* | 9/2014 | Coccaro ............. G10L 15/1822 704/202 |
| 2014/0297267 A1 | 10/2014 | Spencer et al. |
| 2014/0351741 A1 | 11/2014 | Medlock et al. |
| 2015/0051901 A1 | 2/2015 | Stonehouse et al. |
| 2015/0120755 A1* | 4/2015 | Burger ................ G06F 16/9535 707/748 |
| 2015/0134326 A1 | 5/2015 | Bell et al. |
| 2017/0116174 A1* | 4/2017 | Peterson ............... G06F 40/274 |
| 2017/0249017 A1* | 8/2017 | Ryu ..................... G06F 40/274 |
| 2019/0377425 A1* | 12/2019 | Ryu ....................... G06F 40/40 |

OTHER PUBLICATIONS

International Search Report and Written Opinion dated May 23, 2017 by the International Searching Authority in counterpart International Patent Application No. PCT/KR2017/002140 (PCT/ISA/220/210/237).

Communication dated Dec. 29, 2020 issued by the Intellectual Property India Patent Office in Indian Application No. 201817026099.

* cited by examiner

FIG. 2A

| GENDER | FREQUENTLY USED WORDS |
|--------|------------------------|
| MEN | SOCCER, BASEBALL, GAME, BATTERY, TETHERING, ··· |
| WOMEN | SISTER, BROTHER, MOM, deok-jil (ACT OF GETTING OBSESSED WITH SOMETHING), CASE, EMOTICON |

FIG. 2B

| AGE GROUP | FREQUENTLY USED LANGUAGE |
|---|---|
| TEENAGERS | GUYS, HAVE YOU TRIED BULDAK STIR-FRIED NOODLES WITH TRIANGULAR KIMBAP AND STRING CHEESE? TASTES REALLY GOOD! HA! |
| THOSE IN THEIR 20'S | SURPRISING TASTE! FOLKS, HAVE YOU TASTED THIS PUDDING? SO DELICIOUS!! STRONGLY RECOMMEND YOU TO TRY! HAHA |
| THOSE IN THEIR 30'S | MY HUSBAND SUGGESTED TO EAT OUT AFTER A LONG TIME. WAS ALMOST PUZZLED AS MY BABY SON PESTERED FOR BEER AFTER WATCHING HIS DAD DRINKING IT. haha |

FIG. 4A

| FREQUENTLY USED WORDS ACCORDING TO TIME ZONES | | | |
|---|---|---|---|
| WORD USE FREQUENCY | MORNING HOURS | LUNCH TIME HOURS | EVENING HOURS |
| 1. | '지하철' | '점심' | '저녁' |
| 2. | '점심' | '저녁' | '지하철' |
| 3. | '저녁' | '지하철' | '점심' |

FIG. 4B
WORDS RECOMMENDED BASED ON CONTEXT INFORMATION
- FREQUENTLY USED WORDS ACCORDING TO TIME ZONES ARE PREFERENTIALLY RECOMMENDED (PRIORITIES ADJUSTED)
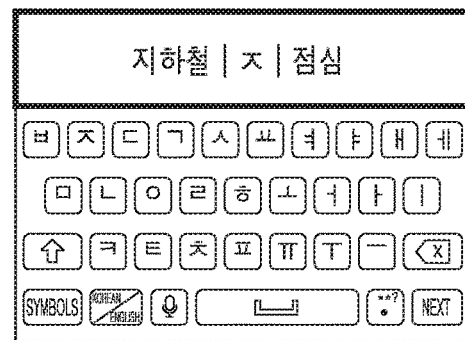
WHEN 'ㅈ' IS INPUT IN THE MORNING HOURS DURING COMMUTE — 410 (411: 지하철 | ㅈ | 점심)
WHEN 'ㅈ' IS INPUT IN THE LUNCH TIME HOURS — 420 (421: 점심 | ㅈ | 저녁)
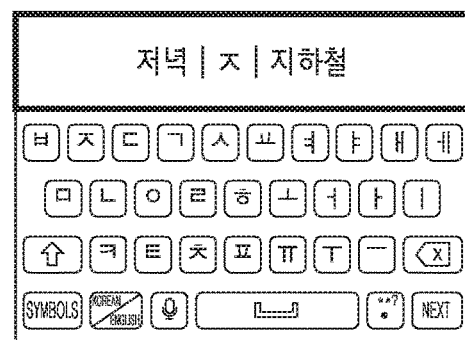
WHEN 'ㅈ' IS INPUT IN THE EVENING HOURS DURING COMMUTE — 430 (431: 저녁 | ㅈ | 지하철)

FIG. 5A

| APPLICATION | RECOMMENDED SENTENCES | |
|---|---|---|
| GAME | 나 오늘 바빠서 게임못해 | —510 |
| MESSENGER | 나 지금 출근중 지하철이야 | —520 |
| CONTACT INFORMATION | 나 XX | —530 |

PREDICTING TEXT INPUT BASED ON USER DEMOGRAPHIC INFORMATION AND CONTEXT INFORMATION

CROSS-REFERENCE TO RELATED APPLICATION

This application is a continuation application of U.S. patent application Ser. No. 15/444,607, filed on Feb. 28, 2017, which claims the benefit of Korean Patent Application No. 10-2016-0024711, filed on Feb. 29, 2016, in the Korean Intellectual Property Office, the disclosures of which are incorporated herein in their entirety by reference.

BACKGROUND

1. Field

The present disclosure relates to methods and apparatuses for predicting a text input, and more particularly, to methods and apparatuses for predicting a text input based on user demographic information and context information, and methods and apparatuses for recommending, to a user, text to be input.

2. Description of the Related Art

As mobile devices have become more compact, interfaces implemented in a hardware form are being removed and replaced by software. A text inputting function makes up a large part of use functions of a mobile device, and users of the mobile device spend much time inputting text.

Accordingly, mobile devices not including a hardware-type text input device require an efficient text input method.

SUMMARY

As described above, a mobile device not including a hardware-type text input device requires an efficient text input method.

Typical methods of predicting a user input text have been developed to allow efficient text input in mobile devices, and examples of these methods may include automatic completion, correction, prediction, blank correction, and emoji input.

However, users may use the same language model, that is, the same recommendation results are presented to all users, or the same recommendation results regardless of the text input situation are provided as information about a situation where text input is taking place is not utilized. Therefore, the probability that recommended words are chosen is lowered, which decreases the effectiveness of improving text input efficiency.

Provided are methods and apparatuses for predicting a text input based on user demographic information and context information, in which a language model respective to user demographic properties or a language model respective to context properties are used to effectively predict and recommend input texts.

Additional aspects will be set forth in part in the description which follows and, in part, will be apparent from the description, or may be learned by practice of the presented exemplary embodiments.

According to an aspect of an exemplary embodiment, a method of recommending a word to be input through a virtual keyboard is provided, wherein the method is performed by a device and includes: displaying a virtual keyboard to be used to input a text on the device; selecting at least one language model; and recommending at least one word related to at least one text inputted through the virtual keyboard based on the at least one inputted text and the at least one selected language model, wherein the language model includes at least one of a demographic language model based on demographic properties of a user of the device, a user input language model based on text input histories of the user of the device, and a context language model based on a context in which the virtual keyboard is executed.

The demographic properties of the user of the device may include at least one of gender, age, region, occupation, hometown, religion, and interests of the user.

The context in which the virtual keyboard is executed may include at least one of information about an application in which the virtual keyboard is executed, information about a time when the virtual keyboard is executed, and information about a place where the virtual keyboard is executed.

The recommending may include recommending, from among words included in the at least one selected language model, a word that includes the inputted text and has been inputted before by the user a predetermined number of times or more.

The method may further include receiving demographic properties of the user of the device.

The method may further include estimating the demographic properties of the user of the device.

The demographic properties of the user of the device may be estimated based on text input histories of the user of the device.

The demographic properties of the user of the device may be estimated based on additional information about the user.

The method may further include: requesting a server to transmit a language model; and receiving from the server the requested language model.

The method may further include: transmitting user information to the server; and receiving a language model updated based on the transmitted user information, from the server.

The recommending may further include determining a priority of the at least one recommended word.

According to an aspect of another exemplary embodiment, an apparatus for recommending a word to be input through a virtual keyboard is provided, wherein the apparatus is used by a device and includes: a displaying unit configured to display a virtual keyboard to input a text on the device; and a word recommendation unit configured to select at least one language model and recommend at least one word related to at least one text inputted through the virtual keyboard based on the at least one inputted text and the at least one selected language model, wherein the language model includes at least one of a demographic language model based on demographic properties of a user of the device, a user input language model based on text input histories of the user of the device, and a context language model based on a context in which the virtual keyboard is executed.

The demographic properties of the user of the device may include at least one of gender, age, region, occupation, hometown, religion, and interests of the user.

The context in which the virtual keyboard is executed may further include at least one of information about an application in which the virtual keyboard is executed, information about a time when the virtual keyboard is executed, and information about a place where the virtual keyboard is executed.

The recommendation unit may be configured to recommend, from among words included in the at least one selected language model, a word that includes the inputted text and has been inputted before by the user a predetermined number of times or more.

The apparatus may further include an input unit configured to receive demographic properties of the user of the device.

The word recommendation unit may be further configured to estimate the demographic properties of the user of the device.

The demographic properties of the user of the device may be estimated based on text input histories of the user of the device.

The demographic properties of the user of the device may be estimated based on additional information about the user.

The word recommendation unit may be further configured to request a server to transmit a language model and receive from the server the requested language model.

The word recommendation unit may be further configured to transmit user information to the server and receive a language model updated based on the transmitted user information, from the server.

The word recommendation unit may be further configured to determine a priority of the at least one recommended word.

In addition, a non-transitory computer readable recording medium having recorded thereon a computer program for executing other methods and systems for implementing the above inventive concept, as well as the above method, is further provided.

In an exemplary embodiment, a method of recommending at least one word to be input through a keyboard, the method, being performed by a device and includes: displaying the keyboard to be used to input at least one character or text on the device; selecting at least one language model; and recommending the at least one word related to at least one character or text inputted on the keyboard, based on the at least one inputted character or text and the at least one selected language model, in which the at least one selected language model comprises at least one of a language model based on demographic properties of a user of the device, a language model based on text input histories of the user of the device, and a language model based on a context in which the keyboard is executed.

In another exemplary embodiment, an apparatus for recommending at least one word to be input through a keyboard, the apparatus, being used by a device, includes: a displaying unit configured to display the keyboard to input at least one character or text on the device; and a word recommendation unit configured to select at least one language model and recommend the at least one word related to at least one character or text inputted on the keyboard, based on the at least one inputted character or text and the at least one selected language model, in which the at least one selected language model comprises at least one of a language model based on demographic properties of a user of the device, a language model based on text input histories of the user of the device, and a language model based on a context in which the keyboard is executed.

BRIEF DESCRIPTION OF THE DRAWINGS

These and/or other aspects will become apparent and more readily appreciated from the following description of the exemplary embodiments, taken in conjunction with the accompanying drawings briefly described below.

FIGS. 2A and 2B illustrate a word or language that is frequently used based on user demographic properties, according to an exemplary embodiment.

FIGS. 4A and 4B illustrate words recommended based on context information according to an exemplary embodiment.

FIGS. 5A and 5B illustrate texts to be input, recommended based on context information, according to an exemplary embodiment.

DETAILED DESCRIPTION

Figure 1:
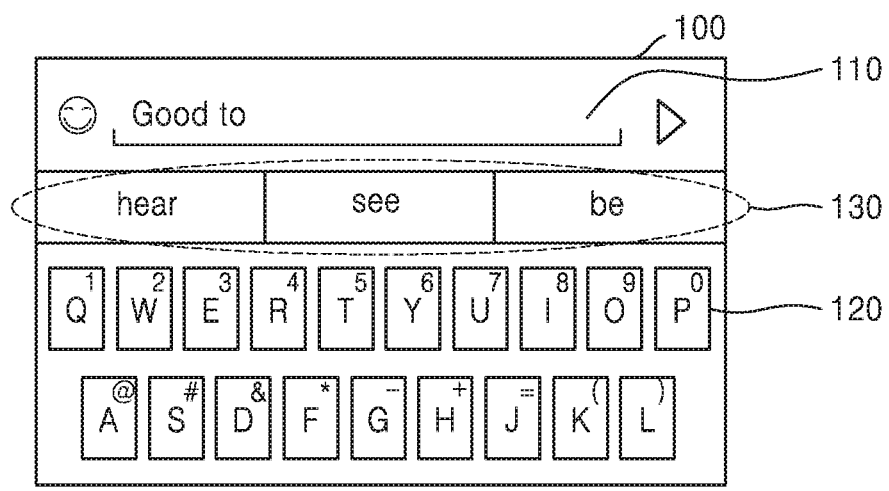
FIG. 1 illustrates a method of recommending a word to be input, based on an input text, according to an exemplary embodiment.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects. Expressions such as "at least one of," when preceding a list of elements, modify the entire list of elements and do not modify the individual elements of the list.

The inventive concept will now be described more fully with reference to the accompanying drawings, in which exemplary embodiments of the inventive concept are shown. The exemplary embodiments will be described in detail such that one of ordinary skill in the art may easily work the inventive concept. It should be understood that the exemplary embodiments of the inventive concept may vary but do not have to be mutually exclusive.

For example, particular shapes, structures, and properties according to a predetermined exemplary embodiment described in this specification may be modified in other exemplary embodiments without departing from the spirit and scope of the present inventive concept. In addition, positions or arrangements of individual components of each of the exemplary embodiments may also be modified without departing from the spirit and scope of the inventive concept. Accordingly, the detailed description below should not be construed as having limited meanings but should be construed to encompass the scope of the claims and any ranges equivalent thereto.

In the drawings, like reference numerals denote like elements in various aspects. Also, elements not related to the description are omitted in the drawings for a clearer description of the inventive concept, and like reference numerals in the drawings denote like elements throughout the specification.

Hereinafter, the inventive concept will be described more fully with reference to the accompanying drawings, in which exemplary embodiments of the inventive concept are shown such that one of ordinary skill in the art may easily work the inventive concept. This inventive concept may, however, be embodied in many different forms and should not be construed as limited to the exemplary embodiments set forth herein.

In the present specification, when a constituent element "connects" or is "connected" to another constituent element, the constituent element contacts or is connected to the other constituent element not only directly but also electrically through at least one of other constituent elements interposed therebetween. Also, when a part may "include" a certain constituent element, unless specified otherwise, it may not be construed to exclude another constituent element but may be construed to further include other constituent elements.

The inventive concept will now be described more fully with reference to the accompanying drawings.

FIG. 1 illustrates a method of recommending a word to be input, based on an input text, according to an exemplary embodiment. In other exemplary embodiments, characters, letters, symbols, signs, keys, etc., may be input. In yet other exemplary embodiments, words, expressions, phrases, etc., may be input.

With advances in integrated circuit technology and related technology, mobiles devices are increasingly becoming more compact, and functions that have been heretofore implemented on different and separate devices in the related art are been increasingly realized on mobile devices. Accordingly, users have obtained freedom from spatial restrictions in that, for example, while being on the go, they are able to take a picture using a camera included in a mobile device and edit and transmit the picture or draft a document by using the mobile device.

A representative example of mobile devices is the smartphone, but other various mobile electronic devices that ensure mobility such as tablet personal computers (PCs) and smartwatches are also other examples.

While a mobile device has diverse different functions, a text input function is most frequently used among the entire functions and applications of the mobile device. However, mobile devices often do not include physical hardware keys for text input, and in this case, a virtual keyboard is displayed on a screen as a user performs an operation of inputting text (for example, selecting a text input window). In other exemplary embodiments, a physical keyboard may be used with a mobile device or a computer.

While the development of integrated circuit technology and battery technology have allowed compact sizes of mobile devices, if a screen of the mobile device is reduced to a predetermined size or smaller, a user may be inconvenienced in inputting text by using a virtual keyboard. In addition, as users of mobile devices hold the device with one hand and input a text with the other hand as is often the case, a more convenient user interface for text input is needed.

In this regard, many mobile devices include a word recommendation function to recommend words to be input, in order to provide a more convenient text input method for users.

A word recommendation function of recommending words to be input is performed as follows. When a user performs an operation to input a text, a virtual keyboard 120 and a display window 110 displaying a previously input text are displayed on a screen. When the user inputs "Good to" through the virtual keyboard 120, then, based on the input text "Good to," words that are determined to have a high likelihood to be input after the above text so as to be recommended, such as "hear", "see," and "be", are displayed (130).

If a word that the user intends to input next is included in the displayed recommended words 130, the user may select the word from the displayed recommended words 130 instead of touching on the virtual keyboard, thereby reducing the number of times the screen needs to be touched for text input.

To recommend a word or text input as described above, a language model (LM) is used. A language model refers to modeling human languages (e.g., English, Korean, etc.) to calculate which word strings match with actually used language and to what extent. A language model is used in language generation and information searching. The exemplary embodiments in this disclosure are described and illustrated using examples based on the English and Korean languages, but are not limited thereto. Other languages may be used to implement the exemplary embodiments described and illustrated in this disclosure.

A language model is generated by collecting corpuses. A corpus refers to linguistic materials, in which texts are collected in a computer-readable form, for language research, and is a collection of documents that show how a language is really used, at a glance. Various types of corpuses exist according to criteria such as medium, time, space, interpretation levels or the like. A corpus literally means a bundle of words that can be regarded as a single chunk.

Generation of a language model involves continuous collecting of corpuses, which are large amounts of text data, and a language model is generated based on the corpuses for text prediction.

However, in word recommendation methods of the related art, when generating a language model, demographic properties regarding a user or context properties regarding text input are not considered, and thus, the probability that a word intended to be input by the user is recommended is low. If a language model that reflects demographic properties regarding a user or context properties regarding text input is used, a more accurate input text may be recommended.

Demographic properties of a user denote properties of a user, who is an agent inputting text, in terms of demographics, and these properties, for example, may refer to the gender, age, occupation, regional dialect, hometown, residential information, physical location, religion, or one or more interests of the user.

Context properties regarding text input refer to a situation or a context in which a text is input, and may be, for example, information about a time when the text is input, information about a place where the text is input, or information about an application via which the text is input. In an exemplary embodiment, the place may be also refer to a physical location, or may refer to a location where the text is input on the screen of a device, a location where the text is input with respect to displayed GUI elements on the screen. The physical location may indicated by GPS coordinate information or other location information based on WLAN, cellular networks, or other wireless networks.

In other words and in addition, the context properties about a text input may refer to context properties of a text input by each user. For example, the context property may refer to pattern information about a text input by a predetermined user according to time zones, pattern information about a text input by a predetermined user according to places, or pattern information about a text input by a predetermined user according to applications.

FIGS. 2A and 2B illustrate an example of a word or language that is frequently used based on user demographic properties.

FIG. 2A illustrates examples of frequently used words according to the gender, which is one of user demographic properties.

For example, men may frequently use words related to sports games such as soccer or baseball, and often use words related to games or words related to IT devices and technology such as batteries or tethering. Thus, by recommending male users words related to sports games, games, or words related to IT or assigning a higher priority to these words, the probability that the words intended to be input by the male users are included in recommended words may be raised.

In another example, women may frequently use words related to family and friends such as sister, brother, or Mom, and words related to their favorite celebrities, such as 'deok-jil' (meaning 'act of getting obsessed with something' in Korean slang language), autograph sessions for fans,' or words related to cosmetics or items such as cases. Thus, by recommending female users words related to family, entertainment, or the like, or assigning a high priority to these words, the probability that words intended to be input by female users are included in recommended words may be increased.

As described above, as frequently used words and language vary depending on the gender, the probability that a word intended to be input by a user is included in recommended words may be increased by using a language model compiled based on demographic information according to the gender of the user.

FIG. 2B illustrates examples of frequently used expressions according to age groups, which is one of user demographic properties.

Expressions frequently used by teenagers may be characterized, for example, by acronyms, slang, a particular speaking style, or a word finishing style of the Korean language such as eum-seum-che (음슴체). Expressions frequently used by those in their twenties may be characterized, for example, by newly coined words that refer to certain situations, instead of simple acronyms. Expressions frequently used by those in their thirties may vary in diverse manners according to the types of group and may largely relate to family.

As described above, as frequently used words and expressions vary depending on the age group, the probability that a word, intended to be input by a user, is included in recommended words may be increased by using a language model compiled based on demographic information according to the age group of the user.

Figure 3:
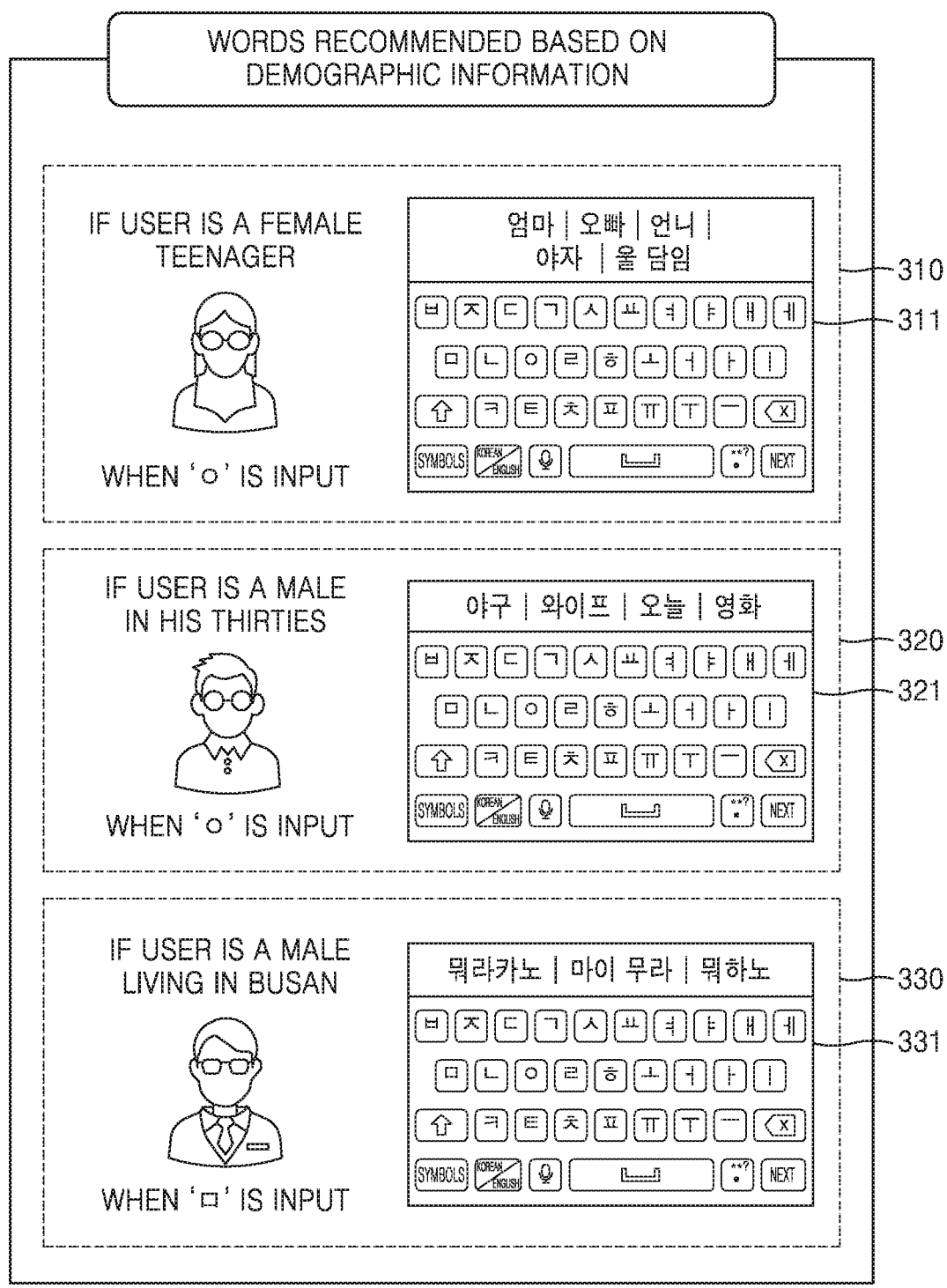
FIG. 3 illustrates recommending words based on user demographic information, according to an exemplary embodiment.

FIG. 3 illustrates a result of words recommended based on user demographic information, according to an exemplary embodiment.

When predicting a character or text input based on a demographic language model compiled based on user demographic information, recommended words vary according to a text input by a user through a virtual keyboard and demographic properties of respective users, as shown in FIG. 3.

If a user is a female teenager and has input 'ㅇ' through a virtual keyboard (310), recommended words 311 reflecting demographic properties regarding the age group and gender may be, for example, '엄마' (Mom), '오빠' (brother), 언니 (sister), '야자' (evening study), '우리 담임' (my class teacher).

If a user is a male in his thirties and has input 'ㅇ' through a virtual keyboard (320), recommended words 321 reflecting demographic properties regarding the age group and gender may be, for example, '야구' (baseball), '와이프' (wife), '오늘' (today), and '영화' (movie).

If a user is a male living in Busan (a city in Korea which uses a regional dialect) and has input ㅁ through a virtual keyboard (330), recommended words 331 reflecting demographic properties regarding the region and gender may be, for example, expressions in the regional dialect such as '뭐라카노' ("mwolakano", meaning 'what are you talking about?'), '마이 무라' ("maimula", meaning 'help yourself and eat a lot'), and '뭐하노' ("mwohano", meaning 'what are you doing?').

If a user is a female in her twenties and has input English character 'b' through a virtual keyboard (320), recommended words reflecting demographic properties regarding the age group and gender maybe, for example, 'baby', 'bag', 'bracelet', 'brother', and 'boss.

If a user is a male in his twenties and has input English character 'b' through a virtual keyboard (320), recommended words reflecting demographic properties regarding the age group and gender maybe, for example, 'baseball', 'basketball', 'bike', 'boss', and 'battery'.

Here, in a word recommendation method which reflects demographic properties, words recommended based on demographic properties may be selected. According to another exemplary embodiment, the word recommendation method may be performed so as to determine or modify priorities of words recommended based on demographic properties.

FIGS. 4A and 4B illustrate words recommended based on context information, according to an exemplary embodiment.

When predicting a character or text input based on a context language model compiled based on context information, the recommended words vary according to the character or text input by a user through a virtual keyboard and context properties, as shown in FIGS. 4A and 4B.

FIG. 4A illustrates frequently used words according to a time when a text is input, which is one of context properties regarding the text, according to an exemplary embodiment.

Mobile device users may frequently inform others via social network services (SNSs) that they are on their way to or from work or school, decide a menu, or make an appointment for lunch or dinner. Thus, if a user has input a Korean character 'ㅈ' to a virtual keyboard, then words such as '지하철' (subway), '점심' (lunch), and '저녁' (dinner), may be recommended as recommended words. The number of times these words are used may vary according to when a text is input.

FIG. 4B illustrates words recommended based on temporal context information, according to an exemplary embodiment.

In the morning hours, it is often the case that people inform others of their commuting situations of going to work or school through SNSs, and they would rather decide a lunch menu or make lunch appointments via SNSs during lunch time hours as opposed to evening hours. Thus, if a Korean character 'ㅈ' is input on a virtual keyboard in the morning hours, words such as '지하철' (subway), '점심' (lunch), '저녁' (dinner) are frequently used in this order.

Similarly, in the lunch time hours, '점심' (lunch), '저녁' (dinner), '지하철' (subway) are used frequently in this order, and in the evening hours, '저녁' (dinner), '지하철' (subway), '점심' (lunch) are frequently used in this order.

Thus, if a user has input 'ㅈ' on a virtual keyboard, and '지하철' (subway), '점심' (lunch), and '저녁' (dinner) are selected as recommendation words, priorities of recommended words are modified based on a time when a text is input.

For example, if 'ㅈ' is input in the morning hours where people commute to work (410), a recommendation priority 411 reflecting a temporal context property may be in an order of '지하철' (subway) and '점심' (lunch).

If 'ㅈ' is input in the lunch time hours (420), a recommendation priority 421 reflecting a temporal context property may be in an order of '점심' (lunch) and '저녁' (dinner). If 'ㅈ' is input in the evening hours (430), a recommendation priority 431 reflecting a temporal context property may be in an order of '저녁' (dinner) and '지하철' (subway).

For other exemplary embodiment, if a user has input a English character 's' to a virtual keyboard, then words such as 'subway', 'stock price', 'school', 'supper' and 'sandwich'. The number of times these words are used may vary according to when a text is input.

In the morning hours, if a English character 's' is input on a virtual keyboard in the morning hours, words such as 'subway', 'school', and 'stock price' may frequently used in this order. Similarly, in the lunch time hours, 'sandwich', 'school', and 'subway' are used frequently in this order, and in the evening hours, 'supper', 'subway', and 'sleep' are frequently used in this order.

For example, if 's' is input in the morning hours, a recommendation propriety reflecting a temporal context property may be in an order of 'subway' and 'school'.

If 's' is input in the lunch hours, a recommendation propriety reflecting a temporal context property may be in an order of 'sandwich' and 'school'. If 's' is input in the evening hours, a recommendation priority reflecting a temporal context property may be in an order of 'supper' and 'subway'.

Here, in the method of recommending words by considering context properties, if different words are recommended according to context properties, a recommendation priority may be determined while including the different words.

In the exemplary embodiment shown in FIGS. 4A and 4B, temporal context information is limited to times of the day, such as morning hours, lunch time hours, and evening hours (i.e., time zones). In some exemplary embodiments, the temporal context information may include a predetermined hour or range of hours in the day. The temporal context information may also include months, weeks, seasons, days, holidays, or anniversaries.

Figure 5B:
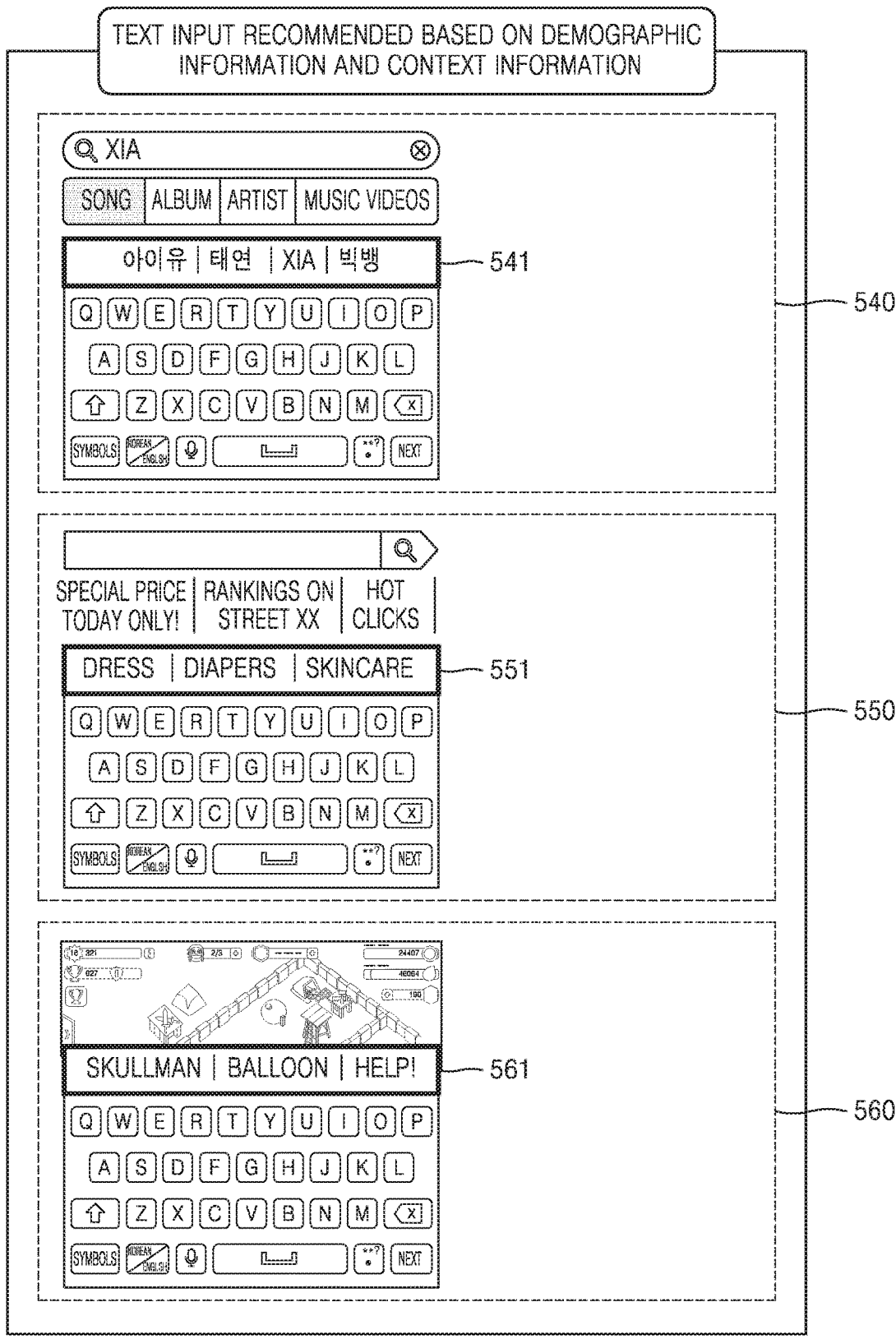

FIGS. 5A and 5B illustrate a text to be input, recommended based on context information, according to an exemplary embodiment. In an exemplary embodiment, at least one sentence or a portion of a sentence respective to the application in which the keyboard is executed may be recommended.

FIG. 5A illustrates sentences to be input, which are recommended based on an application to which a text is input, which is one of context properties.

Mobile device users have different purposes and different conversation partners according to applications. Accordingly, when a user has input a text through a virtual keyboard, words or sentences input to respective applications may have different characteristics.

For example, when a user has input a text on a virtual keyboard in a game application, it is often the case that the user communicates with a game partner regarding details of a game or the user's situation in regard to the game. Accordingly, if the Korean character 'ㄴ' is input through a virtual keyboard during operation of the game application (510), a sentence starting with 'ㄴ' such as "나 오늘 바빠서 게임 많이 못해" ("Na oneul bappaseo geim manh-i mothae", meaning 'I'm too busy today and do not have enough time for game playing')' may be recommended.

If a user has input a text through a virtual keyboard in a messenger application, it is often the case that the user wants to communicate with a partner of the messenger application about the user's situation. Thus, if the Korean character 'ㄴ' is input on a virtual keyboard during operation of the messenger application (520), a sentence starting with 'ㄴ' such as "나 지금 출근 중, 지하철이야" ("Na jigeum chulgeun jung, jihacheol-iya", meaning 'I'm on my way to work, on the subway')' may be recommended.

If a user inputs a text on a virtual keyboard in a contact information application, the user may intend to input or search for contact information. Thus, when the Korean character 'ㄴ' is input through a virtual keyboard during execution of the contact information application (530), for example, a name '나 xx' (e.g., "나길동" ("Na Gil Dong")) may be searched for and recommended from among names stored in the contact information. In this case, recommended names may be determined based on search records.

For other exemplary embodiment, if the English character 'i' is input through a virtual keyboard during operation of the game application, a sentence starting with 'i' such as "I'm too busy to play game." may be recommended.

If the English character 'i' is input on a virtual keyboard during operation of the messenger application, a sentence starting with 'i' such as "I'm on my way to work." may be recommended.

When the English character 'i' is input through a virtual keyboard during execution of the contact information application, for example, a name 'Ixx' (e.g., "Ian") may be searched for and recommended from among names stored in the contact information. In this case, recommended names may be determined based on search records.

Sentences recommended for each application may be determined based on big data, which is a collection of information about texts input by users of various devices via corresponding applications. Sentences to be recommended may also be determined by considering temporal context information or user demographic information in addition to context information about applications.

FIG. 5B illustrates text input which is recommended based on context information about an application and demographic information of a user.

For example, when a text input is conducted during operation of a music application (540), and if the user is a female teenager, then based on context information about the application and demographic information of the user such as the age and gender of the user such as names of Korean pop singers/pop bands, e.g., '아이유' (IU), '태연' (Taeyeon), 'XIA', and '빅뱅' (Big Bang), (are set as recommended words 541. Here, information about text inputs or choices of other female teenage users or input histories of the user may also be additionally used.

For example, when a text input is conducted during execution of a shopping application (550), and the user is a female in her thirties, then based on context information about the application and demographic information of the user such as the age and gender, 'dress', 'diapers', and 'skincare' are set as recommended words 551. Here, information about text inputs or choices of other female users in their thirties or input histories of the user may also be additionally used.

For example, when a text input is conducted during execution of a game application (560), based on context information about the application, words related to items of the game application or words that are frequently input during chatting such as 'skullman', 'balloon', and 'help' are set as recommended words 561. Here, information about text inputs or choices of other users or input histories of the user may also be additionally used.

According to another exemplary embodiment, an input or information about a selected text may be used in a predetermined application as context information about an application that is in the same category as the predetermined application.

For example, histories of text inputs or choices input to a predetermined shopping application may be stored as a log and used as context information for other applications of the shopping category, thereby enabling selection of more accurate recommended words.

Figure 6:
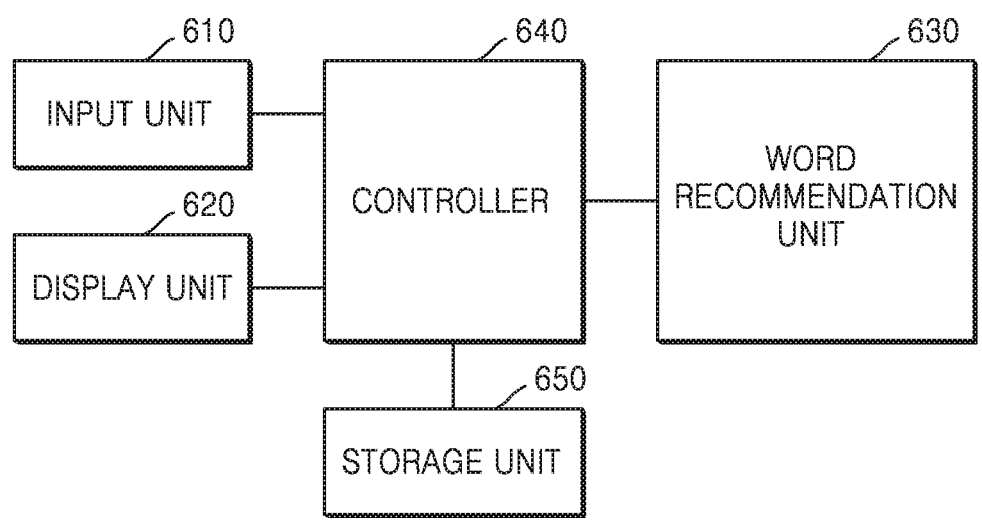
FIG. 6 is a specific structural diagram of a word recommendation apparatus according to an exemplary embodiment.

FIG. 6 is a specific structural diagram of a word recommendation apparatus 600 according to an exemplary embodiment.

As illustrated in FIG. 6, the word recommendation apparatus 600 according to the present exemplary embodiment may include an input unit 610, a display unit 620, a word recommendation unit 630, a controller 640, and a storage unit 650.

The input unit 610 receives a text input through a virtual keyboard displayed on the display unit 620, and receives a word recommended by the word recommendation unit 630 and selected by a user.

The display unit 620 displays a virtual keyboard when the input unit 610 is executed, and when recommended words or priorities of the recommended word are determined by the word recommendation unit 630, the display unit 620 displays the recommended words in an order based on the priorities.

The word recommendation unit 630 predicts a word to be input by a user based on a text input by the user through the virtual keyboard displayed on the display unit 620 and a language model dictionary stored in the storage unit 650, and determines words to be recommended and priorities of the words.

The controller 640 controls an overall operation of the word recommendation apparatus 600. The controller 640 controls operations of the input unit 610, the display unit 620, the word recommendation unit 630, and the storage unit 650 such that the word recommendation apparatus 600 may predict and recommend texts to be input by the user based on a text input via the input unit 610 and a language model dictionary stored in the storage unit 650.

The storage unit 650 may store language model dictionaries according to respective language models, such as a user language model, a demographic language model, or a general language model, and stores various types of information needed by the word recommendation apparatus 600 to recommend words.

The word recommendation apparatus 600, e.g., a word recommendation unit, may be implemented by some internal components inside a mobile device. If the word recommendation apparatus 600 is implemented in a mobile device that does not include an external text input device or hard keys, the input device is typically a virtual keyboard.

Hereinafter, a word recommendation apparatus may be referred to as a 'device' and an input device may be referred to as a 'virtual keyboard' for convenience of description, but the spirit of the present inventive concept is not limited thereto.

Figure 7:
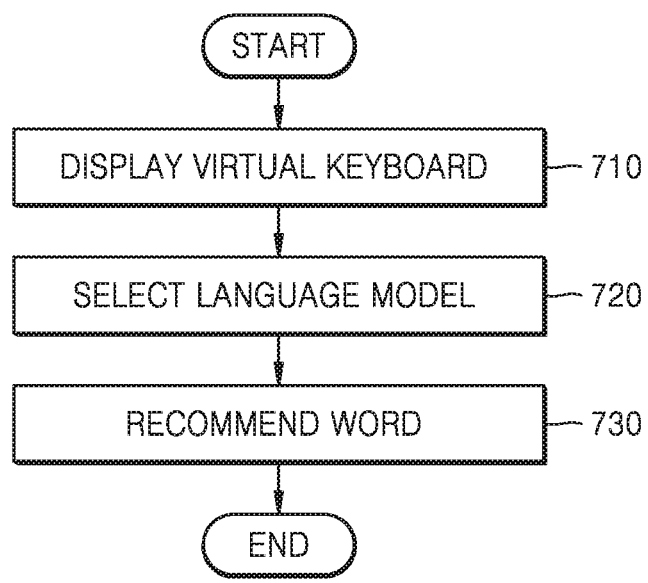
FIG. 7 is an operational flowchart of a word recommendation apparatus according to an exemplary embodiment.

FIG. 7 is an operational flowchart of a word recommendation apparatus according to an exemplary embodiment.

When a user of a device transmits a command for inputting a text, the device displays a virtual keyboard to input a text in operation 710. When the text is input, the device selects a language model to be used for word recommendation in operation 720. The language model includes a general language model that is uniformly applied to all users, and may include at least one of a demographic language model reflecting demographic properties of a user, a user input language model which is based on text input histories of the user, and a context language model reflecting context properties regarding situations in which a text is input.

The device may predict words likely to be input by a user, based on the text input through the virtual keyboard and a selected language model and recommend a word in operation 730.

According to another exemplary embodiment, even when no text is input through a virtual keyboard or even before a text is input, a word having a highest input probability may be recommended based on a selected language model.

For example, if a probability that a predetermined word is initially input is equal to or higher than a predetermined level in a predetermined application, and when a virtual keyboard is executed by the application, a predetermined word may be recommended even if no text is input.

According to another exemplary embodiment, the device may recommend a sentence or a portion of a sentence based on an input text or a selected language model. In yet another exemplary embodiment, the device may recommend at least one sentence or a portion of a sentence, respective to an application in which the keyboard is executed.

Figure 8:
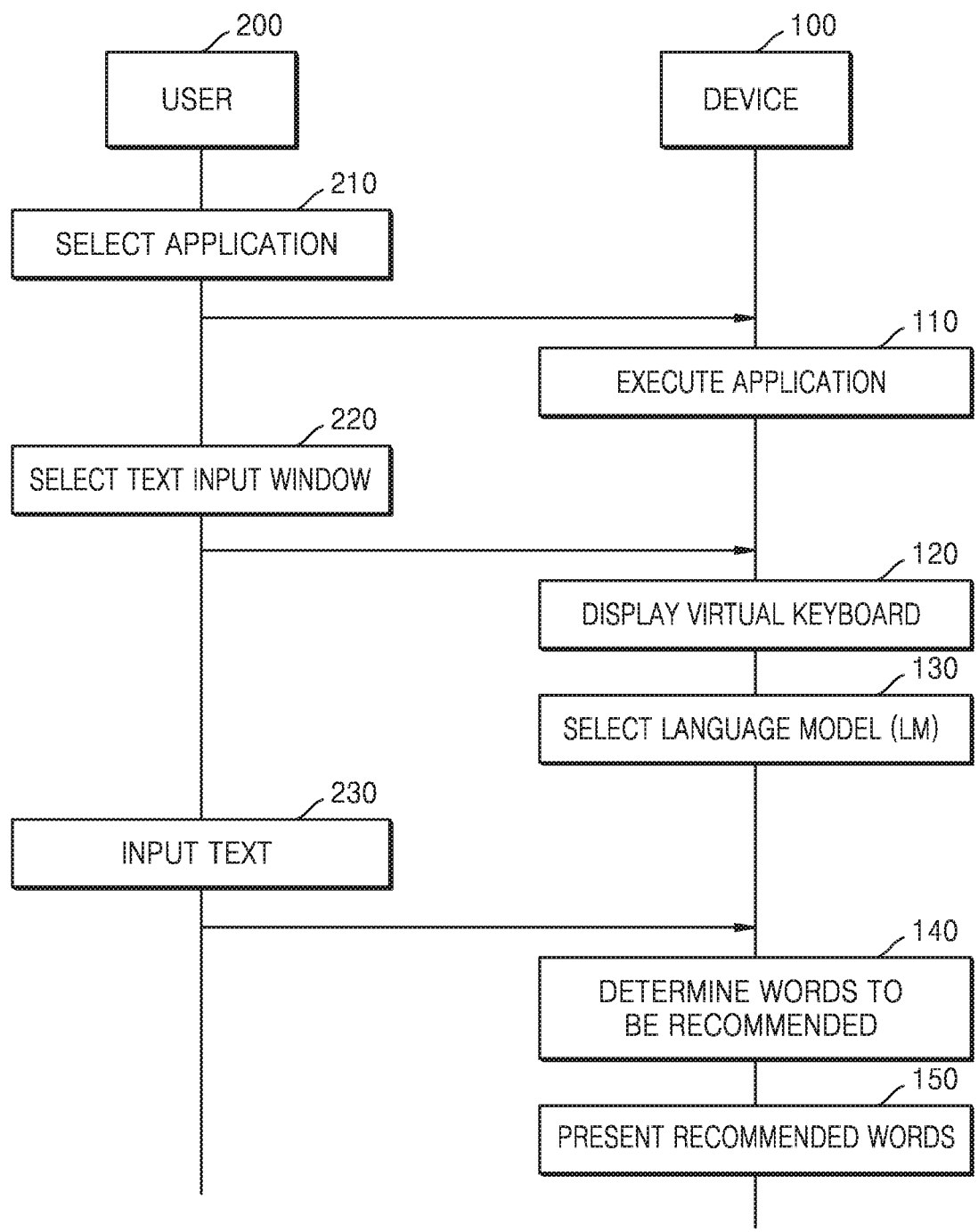
FIG. 8 is a detailed flowchart of a word recommendation method of the exemplary embodiment of FIG. 7.

FIG. 8 is a detailed flowchart of the word recommendation method of the exemplary embodiment of FIG. 7.

A user 200 of a device 100 may select a predetermined application executed on the device 100 in operation 210, and in response to the selection of the user 200, the application is executed on the device 100 in operation 110.

During operation of the application, when the user selects a text input window in operation 220, the device 100 executes an input device and displays a virtual keyboard for a user input in operation 120.

The device 100 then selects a language model needed to recommend words to be input by the user 200 in operation 130. The language model includes a general language model applicable to all users, and may include at least one of a demographic language model reflecting demographic properties of the user 200, a user input language model which is based on text input histories of the user 200, and a context language model reflecting context properties regarding situations in which a text is input.

When the user 200 inputs a text on the virtual keyboard in operation 230, the device 100 determines a word to be recommended based on the text input by the user 200 and the selected language model in operation 140, and presents the recommended word to the user 200 in operation 150.

According to an exemplary embodiment, even when no text is input through a virtual keyboard or even before a text is input, a word having a highest input probability may be recommended based on a selected language model.

For example, if a probability that a predetermined word is initially input is equal to or higher than a predetermined level in a predetermined application, and when a virtual keyboard is executed by the application, even when no text is input, a predetermined word may be recommended.

According to another exemplary embodiment, the device 100 may recommend a sentence or a portion of a sentence based on an input text or a selected language model. In yet another exemplary embodiment, the device 100 may recommend at least one sentence or a portion of a sentence, respective to an application in which the keyboard is executed.

Figure 9:
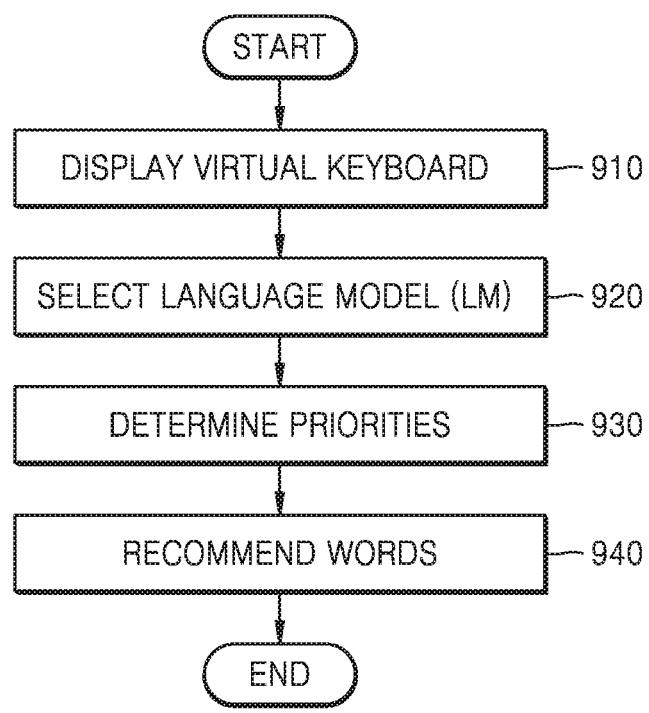
FIG. 9 is an operational flowchart of a word recommendation apparatus according to another exemplary embodiment.

FIG. 9 is an operational flowchart of a word recommendation apparatus according to another exemplary embodiment.

An operation of the word recommendation apparatus of the exemplary embodiment of FIG. 9 is similar to that of the word recommendation apparatus of FIG. 8, except that operation 930 of determining priorities among determined recommended words is further included.

Priorities of words are determined based on a selected language model such that a higher priority is assigned to a word having a higher input probability. For example, when a context language model is selected and the Korean character '지' is selected, a higher priority may be given to the word '지하철' (subway) in the morning hours, and a higher priority may be given to '저녁' (dinner) in the evening hours.

Figure 10:
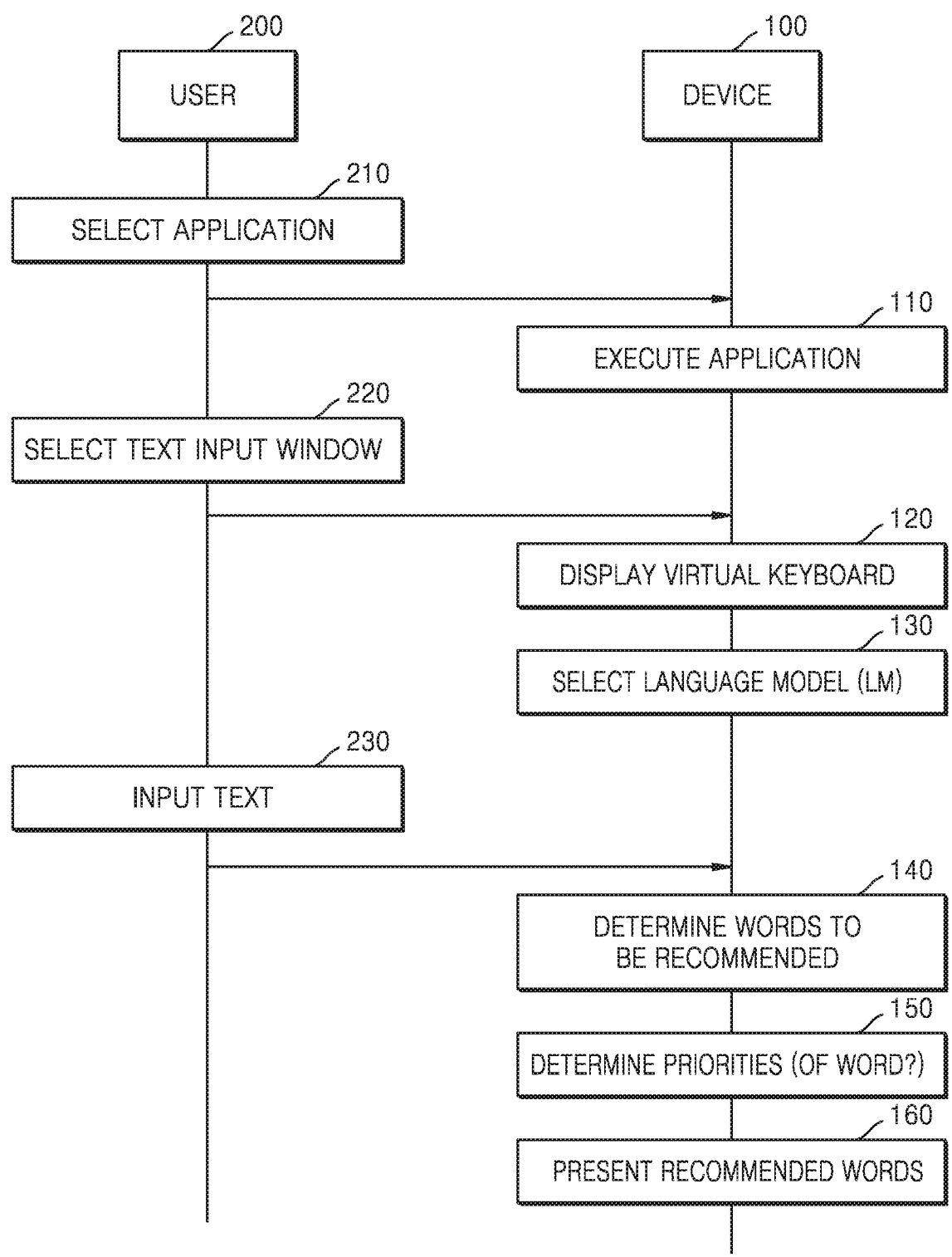
FIG. 10 is a detailed flowchart of a word recommendation method of the exemplary embodiment of FIG. 9.

FIG. 10 is a detailed flowchart of the word recommendation method of the exemplary embodiment of FIG. 9.

The operation of the word recommendation apparatus of the exemplary embodiment of FIG. 10 is similar to that of the word recommendation apparatus of FIG. 7, except that operation 150 of determining priorities among determined recommended words is further included.

Thus, compared to the word recommendation method of FIG. 8, after the device 100 has determined recommended words, the word recommendation method of FIG. 10 further includes operation 150 of determining priorities among the determined recommended words.

Priorities of words are determined based on a selected language model such that a higher priority is assigned to a word having a higher input probability. For example, when a context language model is selected and the Korean character '지' is selected, a higher priority may be given to the word '지하철' (subway) in the morning hours, and a higher priority may be given to '저녁' (dinner) in the evening hours.

Figure 11:
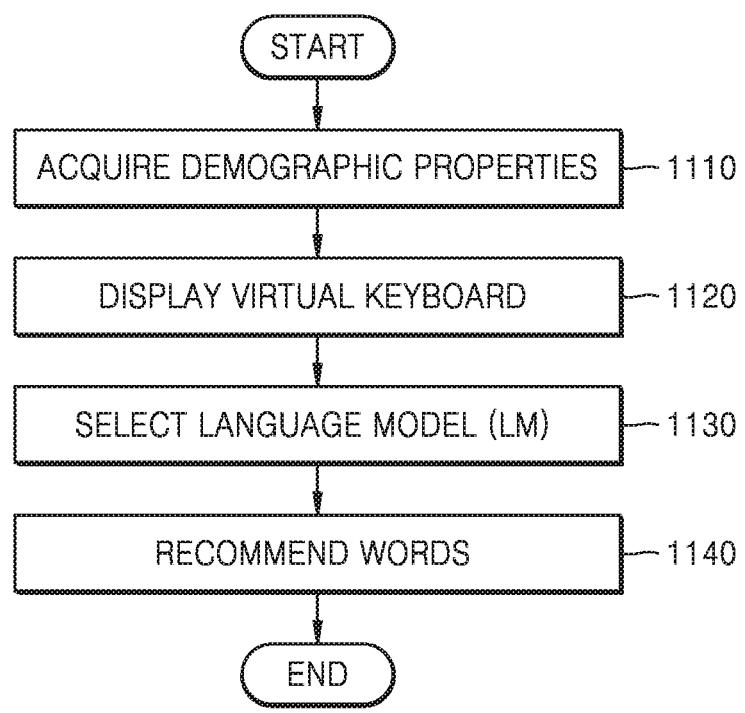
FIG. 11 is an operational flowchart of a word recommendation apparatus according to another exemplary embodiment.

FIG. 11 is an operational flowchart of a word recommendation apparatus according to another exemplary embodiment.

An operation of the word recommendation apparatus of the exemplary embodiment of FIG. 11 is similar to that of the word recommendation apparatus of FIG. 7, except that operation 1110 of acquiring demographic properties is further included.

As described above, demographic properties of a user denote properties of a user, who is an agent inputting text, in terms of demographics, and may be, for example, gender, age, occupation, region or religion of the user.

Operation 1110 of acquiring demographic properties may be performed during an initial setup of a device or when it is decided in advance to use demographic properties and applied to all applications. In an exemplary embodiment, for the cases in which operation 1110 is performed before operation 1130 of selecting a language model so as to acquire demographic properties, operation 1110 may be performed in any order.

Demographic properties may be input by a user or estimated by a device based on text input histories of the user or the like.

Figure 12:
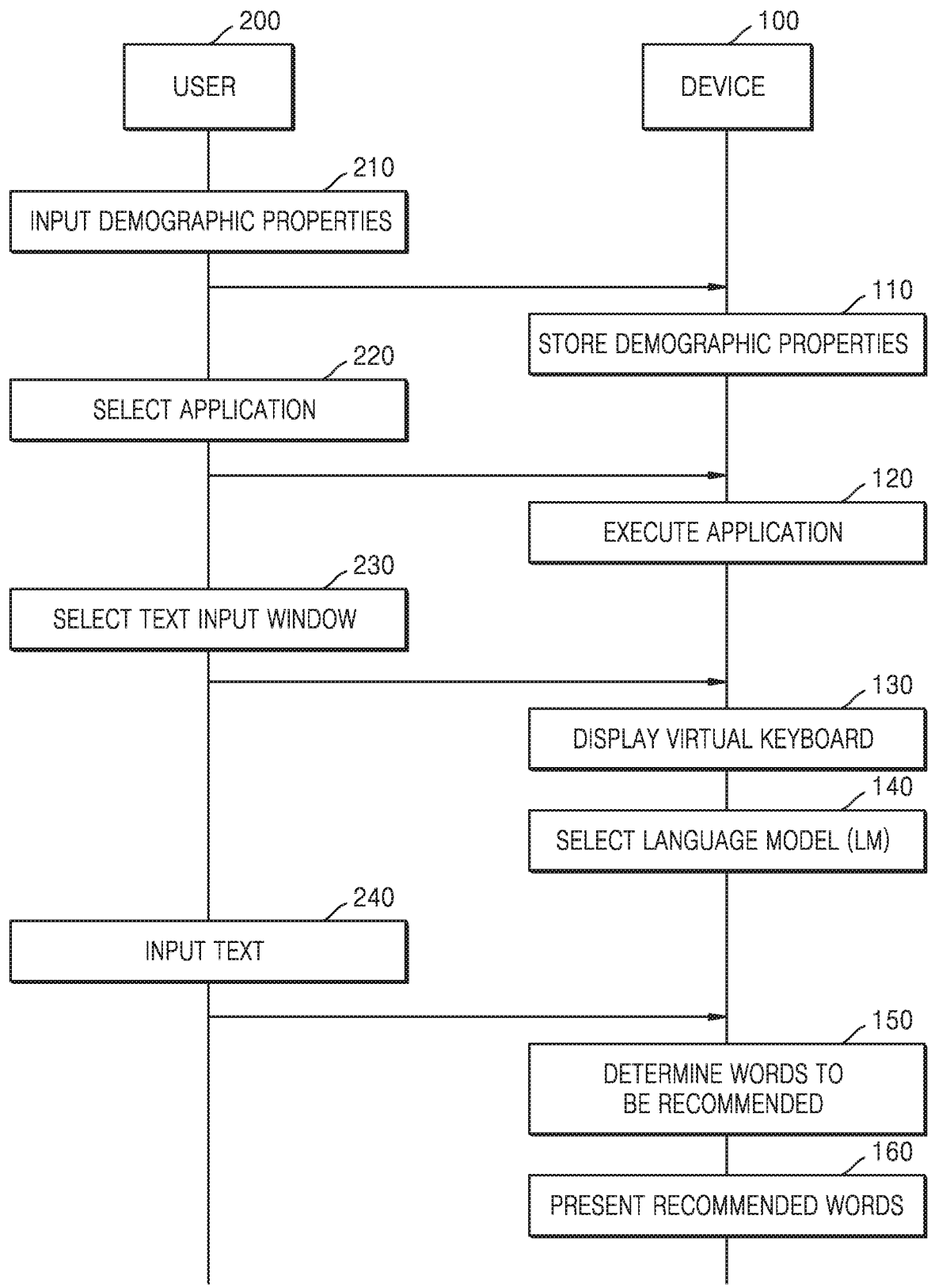
FIG. 12 is a detailed flowchart of a word recommendation method of the exemplary embodiment of FIG. 11.

FIG. 12 is a detailed flowchart of a word recommendation method of the exemplary embodiment of FIG. 11.

In detail, FIG. 12 is a detailed flowchart of a word recommendation method performed according to the exemplary embodiment of FIG. 11, in which a user inputs demographic properties of the user.

An operation of the word recommendation apparatus of the exemplary embodiment of FIG. 12 is similar to that of the word recommendation apparatus of FIG. 7, except that an operation of acquiring demographic properties is further included.

Thus, compared to the word recommendation method of FIG. 8, the word recommendation method of FIG. 12 further includes transmitting demographic properties input in operation 210 by the user 200 and storing the demographic properties in operation 110 by using the device 100.

As described above with reference to FIG. 10, demographic properties may be acquired during an initial setup of a device or when it is decided in advance to use the demographic properties and applied to all applications. In an exemplary embodiment, for the cases in which demographic properties are acquired before the device selects a language model in operation 140, acquiring of demographic properties may be performed in any order.

Figure 13:
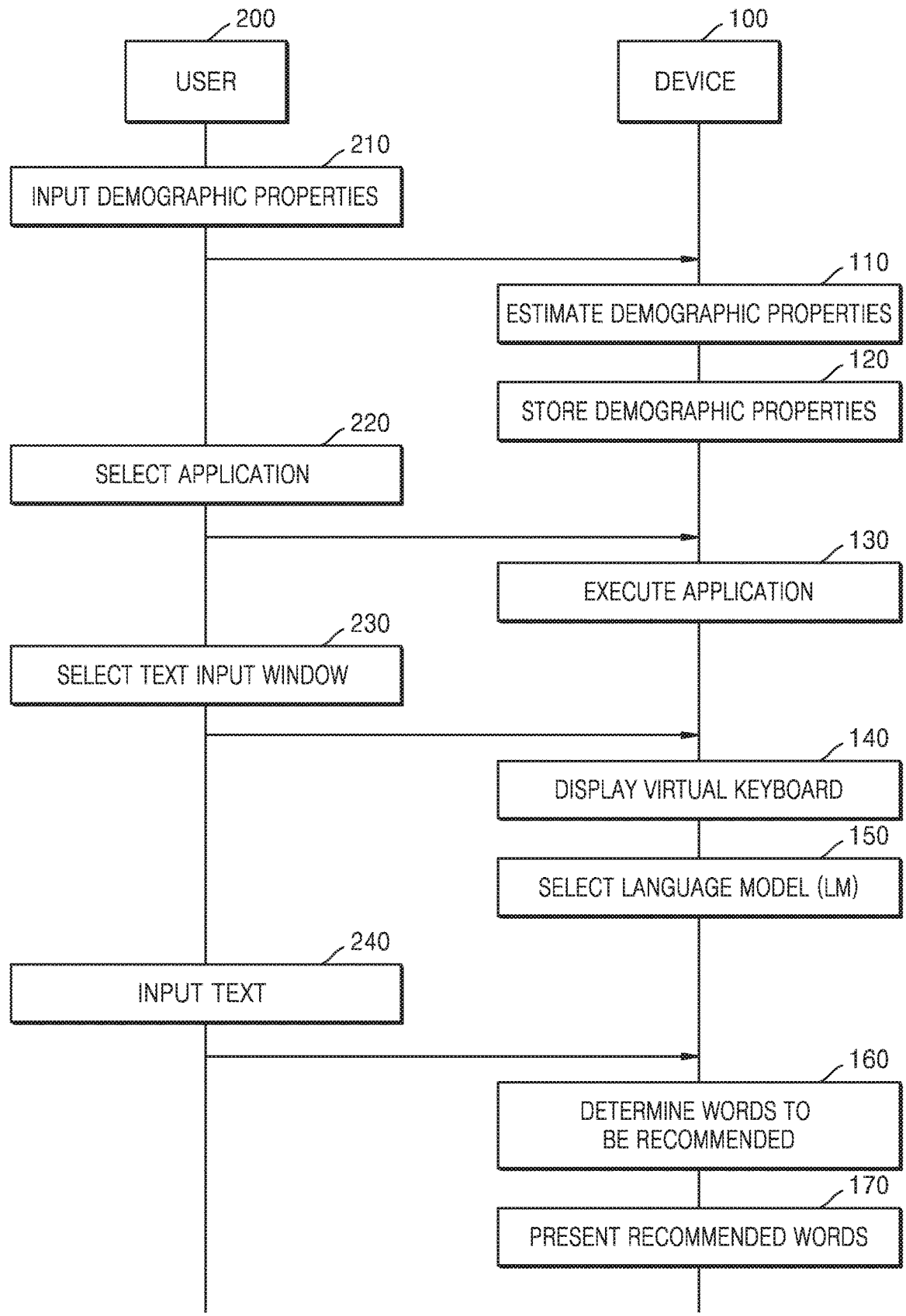
FIG. 13 is a detailed flowchart of a word recommendation method of the example exemplary embodiment of FIG. 11.

FIG. 13 is a detailed flowchart of a word recommendation method according to another exemplary embodiment of FIG. 11.

In detail, FIG. 13 is a detailed flowchart of a word recommendation method performed according to the exemplary embodiment of FIG. 11, in which a device estimates demographic properties.

An operation of the word recommendation apparatus of the exemplary embodiment of FIG. 13 is similar to that of the word recommendation apparatus of FIG. 7, except that an operation of acquiring demographic properties is further included.

Thus, compared to the word recommendation method of FIG. 8, the word recommendation method of FIG. 13 further includes storing, by using the device 100, text input histories when the user 200 inputs a text in operation 210, and estimating demographic properties of the user 200 based on the text input histories in operation 110 by using the device 100 and storing the estimated demographic properties in operation 120 by using the device 100.

As described above with reference to FIG. 10, demographic properties may be acquired during an initial setup of a device or when it is decided in advance to use the demographic properties and applied to all applications. In an exemplary embodiment, for the cases in which demographic properties are acquired before the device selects a language model in operation 140, acquiring of demographic properties may be performed in any order.

Figure 14:
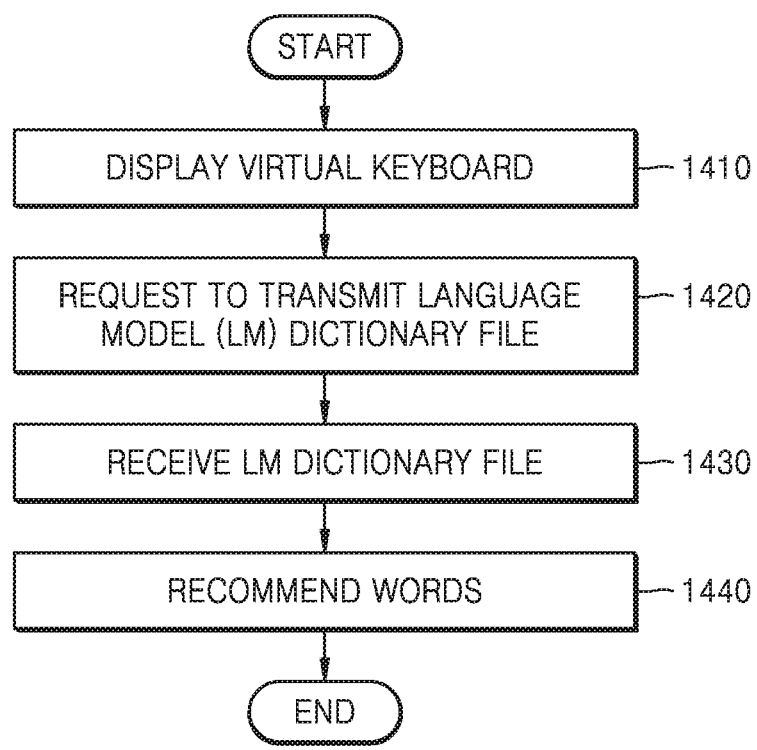
FIG. 14 is an operational flowchart of a word recommendation apparatus according to another exemplary embodiment.

FIG. 14 is an operational flowchart of a word recommendation apparatus according to another exemplary embodiment.

Establishment of a language model requires continuous collecting and examination of corpuses, which are large amounts of text data, and thus it is often difficult to handle this process by using a device with limited storage capacity and power consumption. Thus, collection of corpuses and establishment of language models are typically conducted via a server.

In an exemplary embodiment, if a language model is not stored in a device or a language model stored in a device has to be updated, the device may request a server to transmit a language model and may receive the same.

When a user of a device transmits a command for text input in the exemplary embodiment of FIG. 14, the device displays a virtual keyboard for text input in operation 1410, and selects a language model for word recommendation.

In operation 1420, if a language model dictionary file corresponding to the selected language model is not stored in the device, the device requests a server to transmit the dictionary file.

Upon receiving the language model dictionary file transmitted by the server in operation 1430, the device predicts words likely to be input by the user, based on the language model dictionary file and recommends words in operation 1440.

Figure 15:
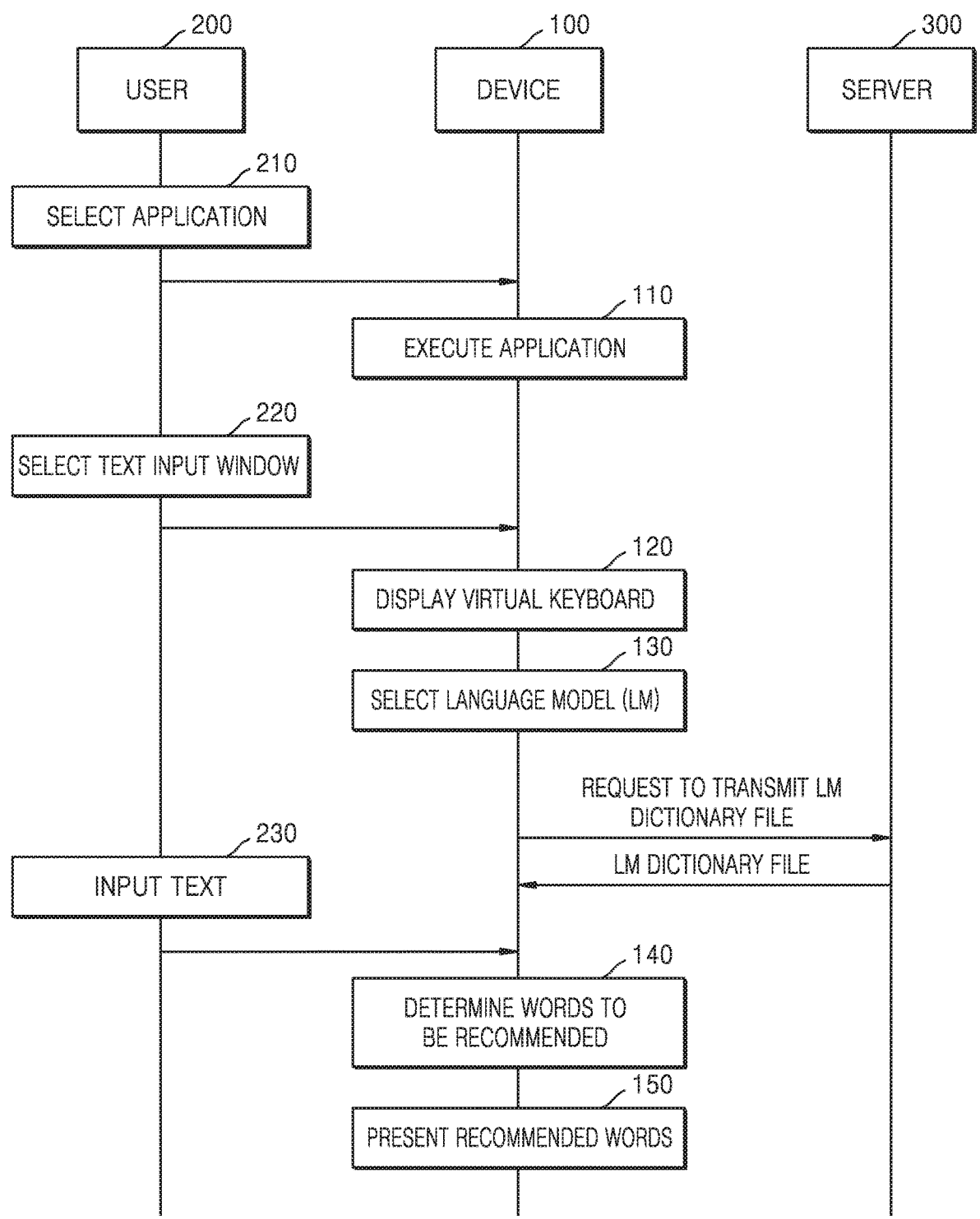
FIG. 15 is a detailed flowchart of a word recommendation method of the exemplary embodiment of FIG. 14.

FIG. 15 is a detailed flowchart of the word recommendation method of the exemplary embodiment of FIG. 14.

The word recommendation method of FIG. 15 includes the same operations as those of the word recommendation method of FIG. 8 up to operation 130 of selecting a language model. After selecting a language model, the device 100 requests a server 300 to transmit a language model dictionary file if a dictionary of the selected language model is not stored in the device 100. In response to the request from the device to transmit the language model dictionary file, the server 300 transmits the language model dictionary file to the device 100, and the device 100 stores the language model dictionary file transmitted from the server 300.

The other subsequent operations of the method of FIG. 15 after operation 130 are the same as those of the method of FIG. 8.

Figure 16:
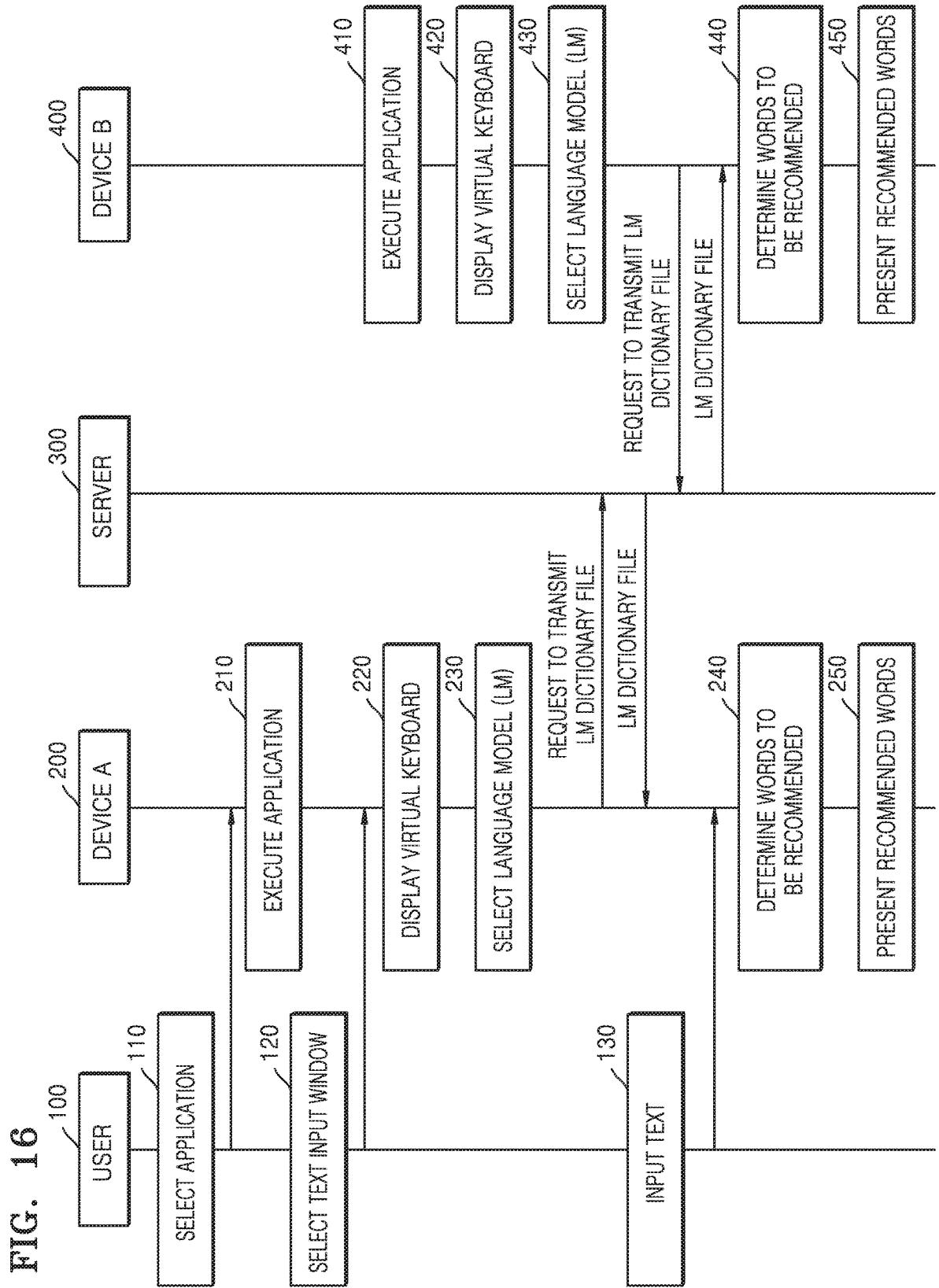
FIG. 16 is a detailed flowchart of a word recommendation method of the exemplary embodiment of FIG. 14.

FIG. 16 is a detailed flowchart of the word recommendation method of FIG. 14, according to another exemplary embodiment.

FIG. 16 is an operational flowchart of a word recommendation method in which one user uses several devices, for example, when a user uses two devices, device A and device B.

Operations of the devices and a server regarding a user text input are similar to those of the detailed flowchart of the word recommendation method of FIG. 15.

For example, device A may be assumed to be a smartphone which is mainly used by the user. The user inputs texts mainly using device A, and thus most of text input histories may be stored in device A. If text input prediction is conducted using device B, which is, for example, a tablet PC that the user occasionally uses, insufficient input histories of the user may increase the probability of wrong word recommendation.

Accordingly, by transmitting the input histories of device A and device B to the server to control the input histories of the user in an integrated manner and transmitting a language model dictionary based on the integrated input histories to device B, accuracy of text input prediction performed using device B may be improved.

Figure 17:
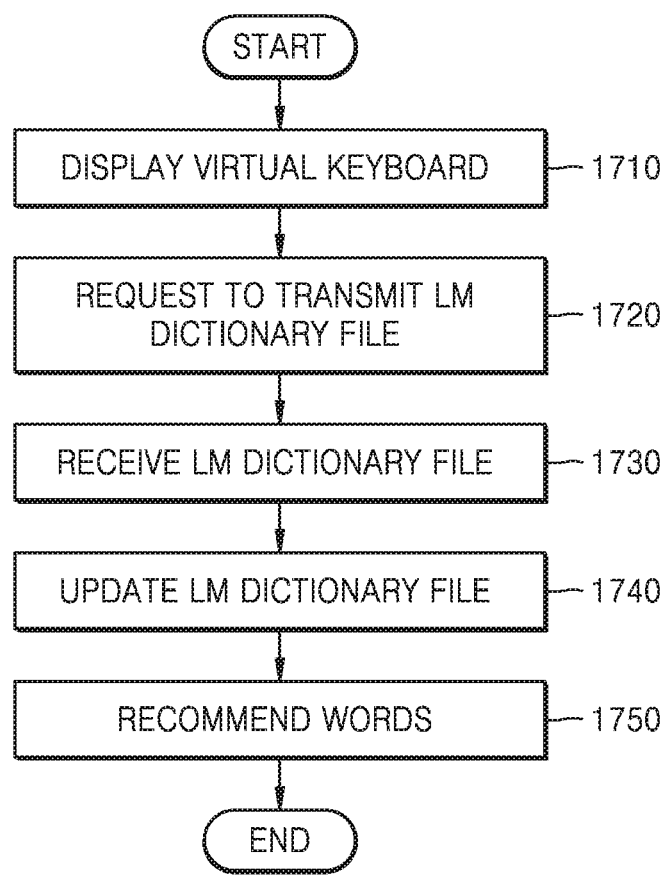
FIG. 17 is an operational flowchart of a word recommendation apparatus according to another exemplary embodiment.

FIG. 17 is an operational flowchart of a word recommendation apparatus according to another exemplary embodiment.

An operation of the word recommendation apparatus of FIG. 17 is similar to that of the word recommendation apparatus of FIG. 14.

When a user of a device transmits a command for text input, the device displays a virtual keyboard for text input in operation 1710 and selects a language model needed for word recommendation.

In a case where, even though a language model dictionary file corresponding to the selected language model is stored in the device, if it is determined that an update of the language model dictionary file is needed, the device requests a server to transmit a latest dictionary file in operation 1720.

Upon receiving the language model dictionary file transmitted by the server in operation 1730, the device updates the previous language model dictionary to a latest language model dictionary in operation 1740, and predicts words to be input by the user, based on the updated language model dictionary and recommends words in operation 1750.

Latest language model dictionaries may be efficiently managed by comparing a version of a language model dictionary stored in a device with a version of a language model dictionary stored in a server or by checking whether the language model dictionary stored in the server is updated.

Figure 18:
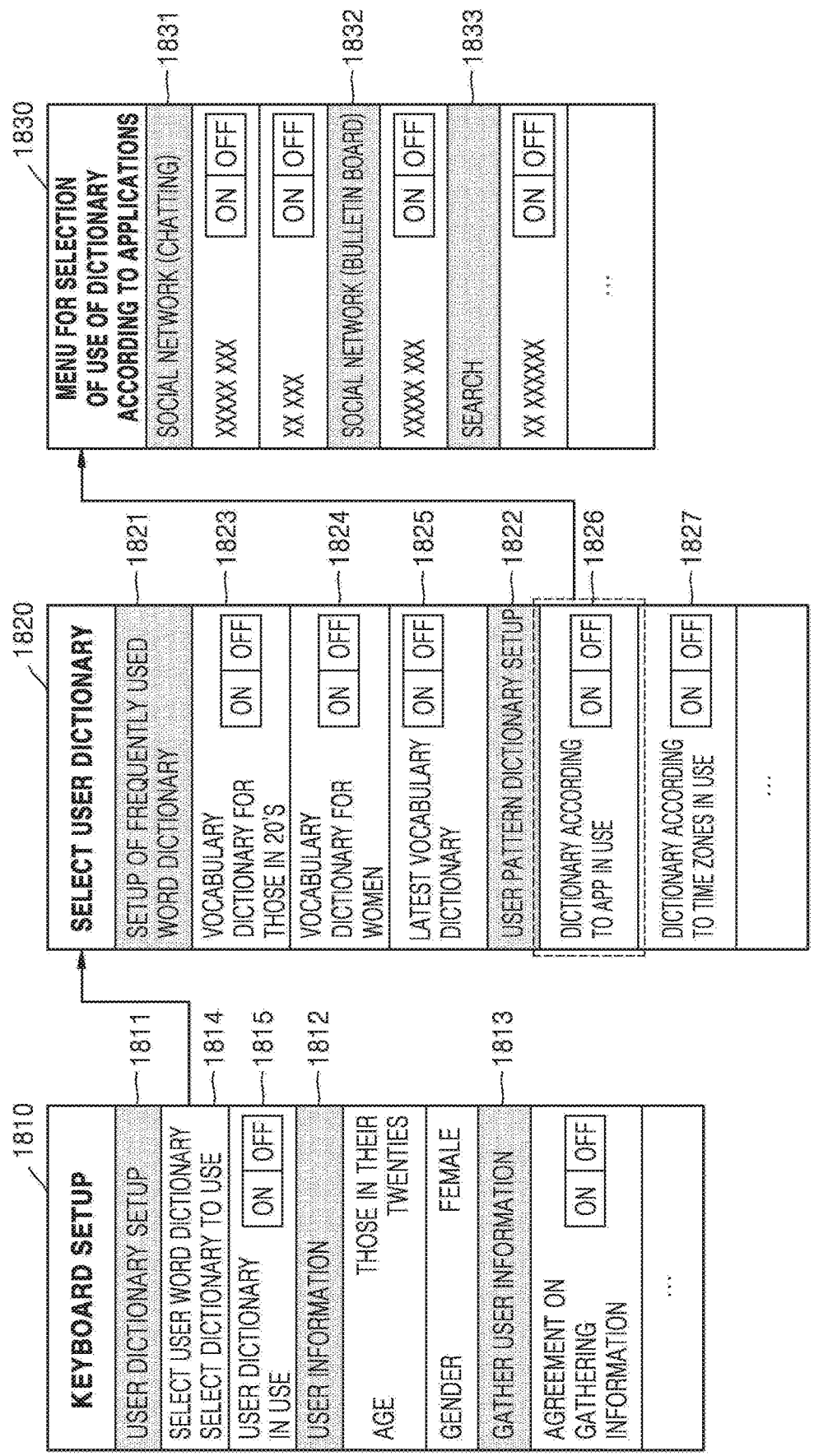
FIG. 18 illustrates a setup of a word recommendation apparatus according to an exemplary embodiment.

FIG. 18 illustrates a setup of a word recommendation apparatus according to an exemplary embodiment.

A keyboard setup screen 1810 may include a user dictionary setup 1811, user information 1812, and an item 1813 regarding agreement on gathering of user information.

The user information 1812 may include the age and gender of the user or the like, and may further include information on demographic properties such as regions or religions.

User information may be set by a user or estimated based on text input histories of the user or additional information about the user. If estimated user information is inaccurate, the user may later correct the information, and if the information is corrected by the user, the corrected information is treated as being more accurate than the estimated information.

Via the user dictionary setup 1811, whether to use a user dictionary 1815 may be selected, and a user word dictionary selection menu 1814 for selecting a user word dictionary to be used may be included.

Upon entering the user word dictionary selection menu 1814, a user dictionary selection screen 1820 is displayed.

The user dictionary selection screen 1820 includes a frequently used word dictionary setup menu 1821 and a user pattern dictionary setup menu 1822.

In the frequently used word dictionary setup menu 1821, the user may set whether to use word dictionaries based on respective demographic properties of the user. For example, if the user is a female in her twenties, whether to use a word dictionary for those in their twenties 1823 and a word dictionary for women 1824 may be set, and in addition, it may be further set whether to use a latest word dictionary 1825 based on a general language model.

In the user pattern dictionary setup 1822, the user may select whether to use a word dictionary based on context properties. For example, whether to use dictionaries according to applications 1826 or dictionaries according to time zones 1827 may be set.

When selecting to use a dictionary according to applications, a menu 1830 for selection of use of dictionary according to applications is displayed. Applications via which text may be input are displayed on the screen for selecting whether to use a dictionary according to applications, and according to each category, a social network category (chatting) 1831, a social network category (bulletin board) 1832, and a search category 1833 or the like may be included. The user may set whether to use a dictionary corresponding to each application on the screen for selecting whether to use a dictionary according to applications.

Figure 19:
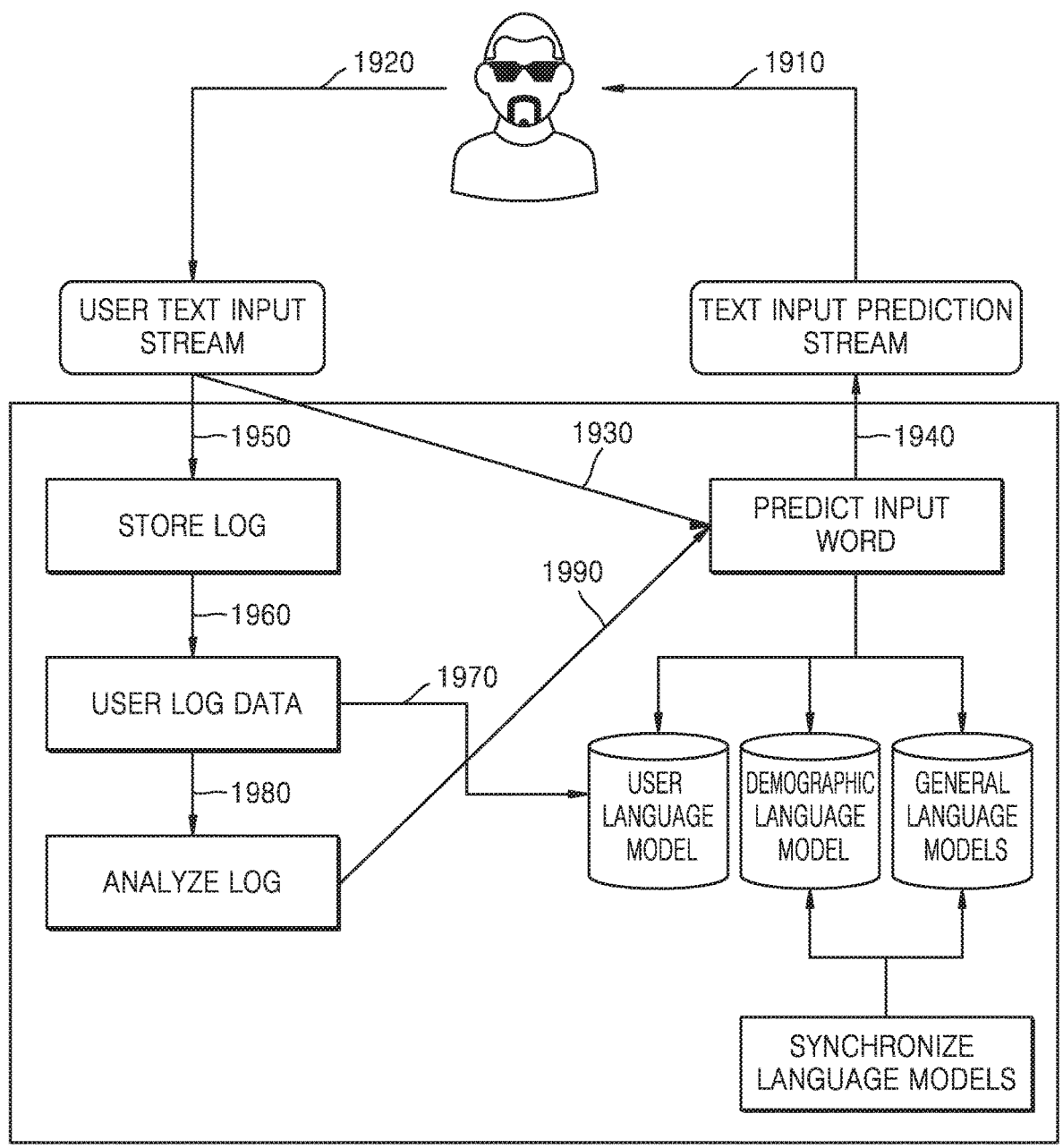
FIG. 19 is an overall operational flowchart of a word recommendation system according to an exemplary embodiment.

FIG. 19 is an overall operational flowchart of a word recommendation system according to an exemplary embodiment.

FIG. 19 illustrates a method of estimating demographic properties by using a user input log and utilizing input patterns according to contexts.

In an exemplary embodiment, when the user executes an input device, an engine for predicting text input predicts and recommends texts to be input in operation 1910. When the user selects one of recommendation results or inputs a predetermined additional text in operation 1920, a character input by the user or a selected recommendation result is transmitted to the text input engine in operation 1930.

Automatic completion, correction, blank correction or the like are performed on the input character and prediction of a next word is performed in operation 1940. When a user input is completed, information about the user input is transmitted to a log storage device in operation 1950, thereby storing the information as user log data in operation 1960.

Information about the completed input is reflected in a user language model in operation 1970, and if a new word is input, the new word is added as a new node to a hash trie, and if previously input words are input, a generation probability value of the words is increased.

A log analyzer performs log data analysis periodically in operation 1980, and if a log having a predetermined size or greater is collected, the log analyzer calculates a similarity between log data and a demographic language model dictionary. If the calculated similarity is equal to or higher than a predetermined value, demographic properties of the user may be estimated as properties of the demographic language model dictionary in operation 1990. Accordingly, it may be set to predict a text input by using the language model dictionary having predetermined demographic properties with respect to a user.

A language model synchronization module periodically checks whether a language model of a language model server is updated, and if a new update is present, the language model synchronization module synchronizes the new update with a device in operation 1991 so as to update the language model dictionary of the device.

The user log data of the exemplary embodiment of FIG. 19 includes context information regarding applications and time about texts input by the user and constitutes a user language model. A user language model may also consist of hash tries, an n-Gram dictionary like a general language model, and also store a time when each text was input or application information or the like.

A demographic language model refers to a language model specified with respect to demographic properties such as gender, age or region. When user demographic properties are acquired, words are predicted based on the user demographic properties.

A general language module is used when user demographic properties are not acquired, and may consist of a hash trie structure for automatic completion, correction, or the like and an n-Gram dictionary for word prediction.

Figure 20:
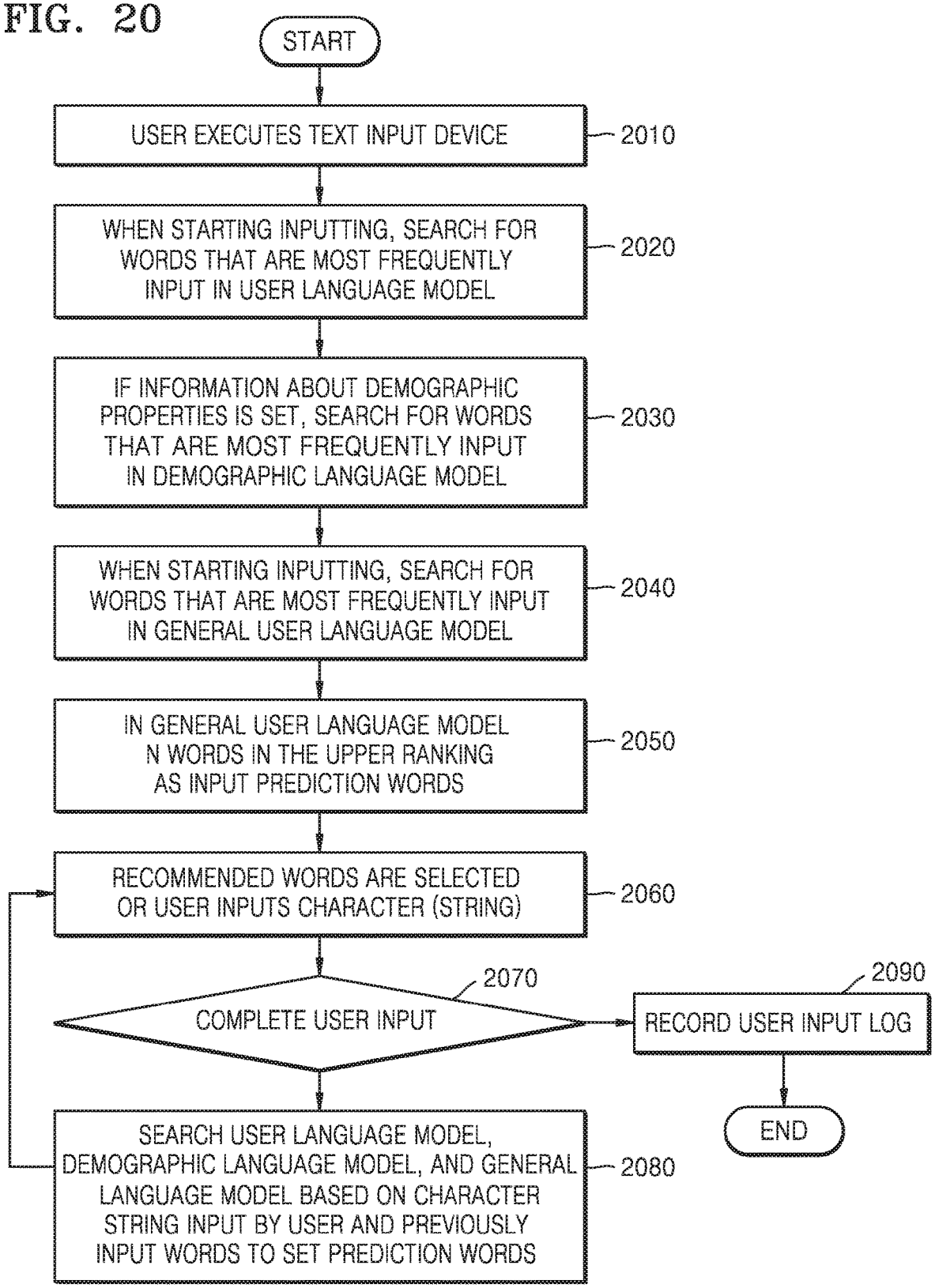
FIG. 20 is an operational flowchart of a word recommendation apparatus according to an exemplary embodiment.

FIG. 20 is an operational flowchart of a word recommendation apparatus according to an exemplary embodiment.

When a user operates an input device in operation 2010, the word recommendation apparatus selects words from respective language models.

When input starts from a user language model based on context properties, most frequently input words in the user language model are searched based on context properties of an input text in operation 2020.

If demographic properties about a user are acquired and set, most frequently input words in a demographic language model are searched based on the set demographic properties in operation 2030.

If a user language model is not set to be used, and if user demographic properties information is not set, input starts in a general language model, and most frequently input words are searched in the general language model in operation 2040.

Priorities are assigned to words selected from the language models, and n words belonging to an upper range are selected as input predicted words in operation 2050. If the user selects recommended words or the user has input a character string in operation 2060, user input is completed in operation 2070, and by using the character string input by the user and a previous input character string, a user language dictionary, a demographic language dictionary, and a general language dictionary are newly searched again to set predicted words in operation 2080. When new prediction words are set in operation 2080, a new recommendation result may be provided to the user, and when the user selects the recommended words, user input is completed.

As the user input is completed, then a user input log is recorded in operation 2090, thereby completing the operation of the word recommendation apparatus.

As described above, according to the exemplary embodiments, as frequently used words and language vary according to demographic properties of a user such as the gender or age group, when a language model that is compiled based on demographic information about a user is used, the probability that a word intended to be input by a user is included in recommended words may be increased.

In addition, as frequently used words and sentence patterns vary according to context properties such as applications via which a text is input or time zones, when a language model that is compiled based on context properties about a text input is used, the probability that a word intended to be input by a user is included in recommended words may be increased.

The exemplary embodiments described above can be implemented as program instructions that can be executed using various computer components and can be written to a non-transitory computer readable recording medium. The non-transitory computer readable recording medium may include program instructions, a data file, a data structure etc. alone or in combination. The program instructions written to the non-transitory computer readable recording medium may be specifically designed and configured for the exemplary embodiments of the inventive concept or may be well-known and available to one of ordinary skill in the art. Examples of the non-transitory computer readable recording medium include magnetic storage media (e.g., hard disks, floppy disks, magnetic tapes, etc.), optical recording media (e.g., CD-ROMs, or DVDs), magneto-optical media (e.g., floptical disks), and hardware devices specifically configured to store and execute program instructions (e.g., ROM, RAM, flash memories, etc.). Examples of the program instructions include not only machine codes generated by using a compiler but also high-level language codes that can be executed on a computer by using an interpreter or the like. The hardware device may be modified to at least one software module in order to execute processes according to the exemplary embodiments, and vice versa.

While the present inventive concept has been particularly shown and described with reference to exemplary embodiments thereof, it will be understood by those of ordinary skill in the art that various changes in form and details may be made therein without departing from the spirit and scope of the inventive concept as defined by the appended claims. The exemplary embodiments described herein should be considered in a descriptive sense only and not for purposes of limitation. Therefore, the scope of the inventive concept is defined not by the detailed description of the inventive concept but by the appended claims, and all differences within the scope will be construed as being included in the inventive concept.

What is claimed is:

1. A method of recommending at least one word to be input through a virtual keyboard, the method, being performed by a device and comprising:
executing a first application and a second application, which belongs to the same application category as the first application, sequentially;
storing, as log data, information for a text inputted or selected during an execution of the first application;
displaying, on the device, the virtual keyboard for inputting at least one character or text during an execution of the second application;
updating context information for the second application by using the stored log data;
selecting a context language model, wherein the context language model comprises the updated context information for the second application; and
recommending the at least one word related to the at least one character or text inputted through the virtual keyboard during the execution of the second application by using the at least one inputted character or text and the selected context language model.

2. The method of claim 1, further comprising:
selecting at least one of a demographic language model based on demographic properties of a user of the device or a user input language model based on text input histories of the user of the device; and
recommending the at least one word related to the at least one character or text inputted on the virtual keyboard, based on the at least one inputted character or text and the at least one selected language model.

3. The method of claim 2, wherein the demographic properties of the user of the device comprise at least one of a gender, an age, a regional dialect, an occupation, a hometown, a religion, and one or more interests of the user.

4. The method of claim 2, wherein the context language model is based on a context in which the virtual keyboard is executed, and the context in which the virtual keyboard is executed comprises at least one of information about a time when the virtual keyboard is executed and information about a place where the virtual keyboard is executed.

5. The method of claim 2, wherein the recommending comprises recommending, from among words included in the at least one selected language model, a word that includes at least one inputted text and has been inputted before by the user a predetermined number of times.

6. The method of claim 5, wherein the demographic properties of the user of the device are estimated based on the text input histories of the user of the device.

7. The method of claim 6, wherein the demographic properties of the user of the device are estimated based on additional information about the user.

8. The method of claim 2, further comprising:
requesting a server to transmit the at least one selected language model;
receiving from the server the at least one selected language model;
transmitting user information to the server; and
receiving a language model updated based on the transmitted user information, from the server.

9. The method of claim 2, wherein the recommending further comprises determining a priority of the at least one recommended word.

10. An apparatus for recommending at least one word to be input through a virtual keyboard, the apparatus comprising at least one processor and being used by a device, the at least one processor is configured to:
execute a first application and a second application, which belongs to the same application category as the first application, sequentially,
store, as log data, information for a text inputted or selected during an execution of the first application,
display, on the device, the virtual keyboard for inputting at least one character or text during an execution of the second application,
update context information for the second application by using the stored log data,
select a context language model, wherein the context language model comprises the updated context information for the second application, and
recommend the at least one word related to the at least one character or text inputted through the virtual keyboard during the execution of the second application by using the at least one inputted character or text and the selected context language model.

11. The apparatus of claim 10, the at least one processor is configured to select at least one of a demographic language model based on demographic properties of a user of the device or a user input language model based on text input histories of the user of the device and recommend the at least one word related to the at least one character or text inputted on the virtual keyboard, based on the at least one inputted character or text and at least one selected language model.

12. The apparatus of claim 11, wherein the demographic properties of the user of the device comprise at least one of a gender, an age, a regional dialect, an occupation, a hometown, a religion, and one or more interests of the user.

13. The apparatus of claim 11, wherein the context language model is based on a context in which the virtual keyboard is executed, and the context in which the virtual keyboard is executed comprises at least one of information about a time when the virtual keyboard is executed and information about a place where the virtual keyboard is executed.

14. The apparatus of claim 11, wherein the at least one processor is configured to recommend, from among words included in the at least one selected language model, a word that includes at least one inputted text and has been inputted before by the user a predetermined number of times.

15. The apparatus of claim 11, wherein the at least one processor is configured to receive the demographic properties of the user of the device.

16. The apparatus of claim 11, wherein the at least one processor is further configured to estimate the demographic properties of the user of the device based on the text input histories of the user of the device.

17. The apparatus of claim 16, wherein the at least one processor is further configured to determine a priority of the at least one recommended word.

18. A non-transitory computer-readable recording medium having recorded thereon a computer program for executing the method of claim 1.

19. The method of claim 1, wherein the selecting of the context language model includes selecting the context language model based on context properties corresponding to application category information of the first application, the context properties indicating a pattern about a text input by a user of the device and text inputs by other users in the first application.

20. The method of claim 19, further comprising:
displaying a user interface for the user of the device to select to use one or more dictionaries according to one or more application categories,
wherein the selecting of the context language model based on the context properties corresponding to the application category information of the first application is performed in response to a user selection via the user interface to use a dictionary according to a category of the first application.

* * * * *